United States Patent
Martinez Corria et al.

(10) Patent No.: US 11,256,879 B2
(45) Date of Patent: Feb. 22, 2022

(54) TRANSLATION SYNTHESIZER FOR ANALYSIS, AMPLIFICATION AND REMEDIATION OF LINGUISTIC DATA ACROSS A TRANSLATION SUPPLY CHAIN

(71) Applicant: INTERNATIONAL BUSINESS MACHINES CORPORATION, Armonk, NY (US)

(72) Inventors: Alejandro Martinez Corria, Barcelona (ES); Santiago Pont Nesta, Badalona (ES); Consuelo Rodríguez Magro, Madrid (ES); Francis X. Rojas, Austin, TX (US); Linda F. Traudt, Las Vegas, NV (US); Saroj K. Vohra, New Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/459,877

(22) Filed: Jul. 2, 2019

(65) Prior Publication Data
US 2019/0325030 A1 Oct. 24, 2019

Related U.S. Application Data

(63) Continuation of application No. 15/415,372, filed on Jan. 25, 2017, now Pat. No. 10,380,263.

(30) Foreign Application Priority Data

Nov. 15, 2016 (EP) .................................. 16382531

(51) Int. Cl.
*G06F 40/30* (2020.01)
*G06F 40/47* (2020.01)
(Continued)

(52) U.S. Cl.
CPC ............ *G06F 40/51* (2020.01); *G06F 40/211* (2020.01); *G06F 40/253* (2020.01); *G06F 40/30* (2020.01); *G06F 40/47* (2020.01)

(58) Field of Classification Search
CPC .. G06F 17/28; G06F 17/2809; G06F 17/2818; G06F 17/2827; G06F 17/2836;
(Continued)

(56) References Cited

U.S. PATENT DOCUMENTS 4,821,230 A * 4/1989 Kumano ................. G06F 40/30
704/6
4,994,966 A * 2/1991 Hutchins ............... G06F 40/253
704/9

(Continued)

FOREIGN PATENT DOCUMENTS

JP        07282063 A * 10/1995 ........... G06F 40/242
WO     0045374        8/2000

(Continued)

OTHER PUBLICATIONS

Singh et al., "Improving the quality of Machine Translation using Rule Based Tense Synthesizer for Hindi", IEEE, 2015, 5 pages.

(Continued)

*Primary Examiner* — Lamont M Spooner
(74) *Attorney, Agent, or Firm* — William Hartwell; Andrew D. Wright; Roberts Calderon Safran & Cole P.C.

(57) ABSTRACT

Systems and methods for translating a source segment are disclosed. In embodiments, a computer-implemented method for translating a source segment comprises receiving, by a computing device, the source segment in a first language to be translated into a second language; identifying, by the computing device, linguistic markers within the source segment and associated noise values to produce a tagged source segment, wherein the linguistic markers are
(Continued)

associated with one or more linguistic patterns likely to introduce noise into a translation channel; transforming, by the computing device, the tagged source segment into an amplified source segment; and sending, by the computing device, the amplified source segment to a machine translation module, wherein the machine translation module is configured to process the amplified source segment to produce a return amplified match in the second language.

20 Claims, 21 Drawing Sheets

(51) Int. Cl.
G06F 40/51 (2020.01)
G06F 40/211 (2020.01)
G06F 40/253 (2020.01)

(58) Field of Classification Search
CPC ............ G06F 17/2845; G06F 17/2854; G06F 17/2863; G06F 17/2872; G06F 17/289; G06F 17/2881; G06F 40/58; G06F 40/44; G06F 40/45; G06F 40/47
USPC ......................................................... 704/2–8
See application file for complete search history.

(56) References Cited

U.S. PATENT DOCUMENTS

| | | | |
|---|---|---|---|
| 6,278,968 B1 | 8/2001 | Franz et al. | |
| 7,970,598 B1* | 6/2011 | Flanagan | G06F 40/58 704/2 |
| 8,126,700 B2* | 2/2012 | Fasciani | G06F 40/169 704/4 |
| 8,249,858 B2 | 8/2012 | Bodin et al. | |
| 9,311,299 B1* | 4/2016 | Petrov | G06F 40/40 |
| 9,336,207 B2 | 5/2016 | Martinez Corria et al. | |
| 2001/0029455 A1* | 10/2001 | Chin | G06F 40/58 704/277 |
| 2007/0016401 A1* | 1/2007 | Ehsani | G10L 15/005 704/9 |
| 2007/0050191 A1* | 3/2007 | Weider | G10L 21/06 704/275 |
| 2008/0071518 A1* | 3/2008 | Narayanan | G06F 40/58 704/2 |
| 2009/0192783 A1* | 7/2009 | Jurach, Jr | G06F 40/45 704/4 |
| 2011/0137636 A1* | 6/2011 | Srihari | G06F 40/53 704/2 |
| 2011/0288849 A1* | 11/2011 | Jang | G06F 40/42 704/2 |
| 2012/0035914 A1* | 2/2012 | Brun | G06F 40/263 704/9 |
| 2012/0123766 A1* | 5/2012 | Anisimovich | G06F 40/58 704/3 |
| 2012/0254333 A1* | 10/2012 | Chandramouli | G06N 5/04 709/206 |
| 2013/0066898 A1* | 3/2013 | Wu | G06F 16/9027 707/769 |
| 2013/0080152 A1* | 3/2013 | Brun | G06F 40/289 704/9 |
| 2013/0158976 A1* | 6/2013 | Chiang | G06F 40/242 704/3 |
| 2013/0173247 A1* | 7/2013 | Hodson | G06F 40/45 704/4 |
| 2013/0197896 A1* | 8/2013 | Chalabi | G06F 40/268 704/2 |
| 2013/0325442 A1* | 12/2013 | Dahlmeier | G06F 40/274 704/9 |
| 2014/0114642 A1* | 4/2014 | van den Oever | G06F 40/47 704/2 |
| 2014/0297252 A1* | 10/2014 | Prasad | G10L 15/01 704/2 |
| 2014/0303960 A1* | 10/2014 | Orsini | H04L 51/04 704/2 |
| 2014/0358519 A1* | 12/2014 | Mirkin | G06F 40/51 704/3 |
| 2015/0154184 A1* | 6/2015 | Bahgat | G06F 40/268 704/2 |
| 2015/0286632 A1* | 10/2015 | Meunier | G06F 40/51 704/2 |
| 2015/0378990 A1 | 12/2015 | Martinez Corria et al. | |
| 2016/0124944 A1* | 5/2016 | Andreoli | G06F 40/51 704/2 |
| 2016/0170974 A1* | 6/2016 | Martinez Corria | G06F 40/58 704/4 |
| 2016/0357731 A1* | 12/2016 | Zorzin | G06F 40/30 |
| 2016/0358596 A1* | 12/2016 | Singh | G10L 13/08 |
| 2017/0197152 A1* | 7/2017 | Bojja | G06F 40/216 |
| 2018/0137108 A1 | 5/2018 | Martinez Corria et al. | |
| 2018/0314689 A1* | 11/2018 | Wang | G10L 15/07 |

FOREIGN PATENT DOCUMENTS

| | | |
|---|---|---|
| WO | 0045377 | 8/2000 |
| WO | 2008045815 | 4/2008 |

OTHER PUBLICATIONS

Canfield et al., "Translating a Digital Signal Modulation Synthesizer from LabVIEW to Simulink", Roger Williams University, accessed Sep. 7, 2016, 6 pages.

Specia et al. "Improving the confidence of machine translation quality estimates", ResearchGate, Aug. 2009, 9 pages.

Say et al. "Current Approaches to Punctuation in Computational Linguistics", Computers and the Humanities, 30: 457-469, Kluwer Academic Publishers, 1997, 13 pages.

The Editors of Encyclopedia Britannica, "Diminishing returns", Enclyclopedia Britannica, accessed Jan. 25, 2017, 4 pages.

List of IBM Patents or Patent Applications Treated as Related, Jul. 1, 2019, 1 page.

* cited by examiner

{src_amplified_segment} 154

For example, if your user name is @codeph-0@, your password is @codeph-1@, the Vmware vCenter host is @codeph-2@, Vmware vCenter is listening on port @codeph-3@, and the managed object ID of the resource pool is @codeph-4@, the code look like the following example

Machine Translation 56

{tgt_amplified_match} 156

Por ejemplo, si el nombre de usuario es @codeph-0@, la contraseña es @codeph-1@, el host de Vmware vCenter host es @codeph-2@, Vmware vCenter está a la escucha en el puerto @codeph-3@, y el ID de objeto gestionado de la agrupación de recursos es @codeph-4@, el código es similar al ejemplo siguiente:

LA2 Remediator 124

{tgt_match} 58A

Por ejemplo, si el nombre de usuario es <codeph>user1</codeph>, la contraseña es <codeph>securepassword</codeph>, el host de Vmware vCenter host es <codeph>vcenterhost.example.com</codeph>, Vmware vCenter está a la escucha en el puerto <codeph>443</codeph>, y el ID de objeto gestionado de la agrupación de recursos es <codeph>resgroup-112233<codeph>, el código es similar al ejemplo siguiente:

FIG. 6B

TRANSLATION SYNTHESIZER FOR ANALYSIS, AMPLIFICATION AND REMEDIATION OF LINGUISTIC DATA ACROSS A TRANSLATION SUPPLY CHAIN

BACKGROUND

The present invention relates generally to language translation supply chains and, more particularly, to a translation synthesizer for analysis, amplification and remediation of linguistic data across translation supply chains.

Today, machine-human translation services are employed by firms to produce high quality and human fluent translations using an integration of linguistic assets/corpuses, computer-aided translation editors, human professional linguists and operational management systems across a translation supply chain. The art of measuring linguistic noise (errors) allows the language translation operations of a translation supply chain to measure noise at the component and supply chain levels. Lacking is the ability to measure productivity per unit across linguistic integrated components (L-ICs), and the ability to identify and quantify grammatical/syntactic/semantic (GSS) patterns that impact the efficiency of the L-ICs. Specifically, conventional translation operations are lacking in the following areas: (1) there is no uniform method for classifying/categorizing Linguistic noise (GSS) patterns at operational levels; (2) there is no open/public method for the plug-and-play configuration of a translation supply chain integrating L-ICs; (3) there is no uniform unit for measuring the productivity per unit of L-IC within a translation supply chain (specifically lacking is the ability to measure unit productivity at the segment level); (4) there is no method for quantifying a noise:word ratio as a primary measurement of productivity per segment; (5) there is no operational visualization of Linguistic noise (GSS) patterns nor the ability to remediate the increasing Linguistic noise (GSS) patterns across a global translation supply chain; and (6) there are no methods for identifying the acceptable range (i.e. thresholds) for GSS markers and the ability to map a GSS marker to a pluggable remediation handler function.

SUMMARY

In an aspect of the invention, a computer-implemented method for translating a source segment includes: receiving, by a computing device, the source segment in a first language to be translated into a second language; identifying, by the computing device, linguistic markers within the source segment and associated noise values to produce a tagged source segment, wherein the linguistic markers are associated with one or more linguistic patterns likely to introduce noise into a translation channel; transforming, by the computing device, the tagged source segment into an amplified source segment; and sending, by the computing device, the amplified source segment to a machine translation module, wherein the machine translation module is configured to process the amplified source segment to produce a return amplified match in the second language. Advantageously, the computer-implemented method provides for improved machines translations of the source segment by the machine translation module.

In aspects, the computer-implemented method of the present invention further includes receiving, by the computing device, the return amplified match from the machine translation module; remediating, by the computing device, the return amplified match to produce a target match; and sending, by the computing device, the match to a downstream module; in one aspect a post-editing module. Advantageously, this method addresses linguistic noise within the translation supply chain to provide the post-editing module with an improved translation of the source segment.

In aspects, the computer-implemented method of the present invention further includes analyzing, by the computing device, post-editing logs to identify additional linguistic patterns contributing to translation inefficiency; generating, by the computing device, a predictive model based on the identified additional linguistic patterns; and saving, by the computing device, the predictive model in a store. Advantageously, this method enables the generation of predictive models which may be utilized by the system in future source segment translations to address linguistic patterns identified as contributing to translation inefficiency.

In another aspect of the invention, there is a computer program product for translating a source segment. The computer program product includes a computer readable storage medium having program instructions embodied therewith. The program instructions are executable by a computing device to cause the computing device to: receive the source segment in a first language to be translated into a second language; identify linguistic markers within the source segment and associated noise values to produce a tagged source segment, wherein the linguistic markers are associated with one or more linguistic patterns likely to introduce noise into a translation channel; transform the tagged source segment into an amplified source segment including added metadata; and send the amplified source segment to a machine translation module, wherein the machine translation module is configured to process the amplified source segment to produce a return amplified match in the second language. Advantageously, the computer program product provides for improved machines translations of the source segment by the machine translation module.

In aspects, the computer program product of the present invention further causes the computing device to: receive the return amplified match from the machine translation module; remediate the return amplified match to produce a target match; and send the target match to a post-editing module. Advantageously, the computer program product addresses linguistic noise within the translation supply chain to provide the post-editing module with an improved translation of the source segment.

In aspects, the computer program product of the present invention further causes the computing device to: analyze the post-editing logs to identify additional linguistic patterns contributing to translation inefficiency; generate a predictive model based on the identified additional linguistic patterns; and save the predictive model in a store. Advantageously, this computer program produce enables the generation of predictive models which may be utilized by the system in future source segment translations to address linguistic patterns identified as contributing to translation inefficiency.

In another aspect of the invention, there is a system for translating a source segment. The system includes a CPU, a computer readable memory and a computer readable storage medium associated with a computing device. The system also includes: program instructions to receive the source segment in a first language to be translated into a second language; program instructions to identify linguistic markers within the source segment and associated noise values to produce a tagged source segment with tags, wherein the linguistic markers are associated with one or more linguistic patterns likely to introduce noise into a translation channel; program instructions to transform the tagged source segment into an amplified source segment, wherein the tags are replaced with metadata; and program instructions to send the amplified source segment to a machine translation module, wherein the machine translation module is configured to process the amplified source segment to produce a return amplified match in the second language; wherein the program instructions are stored on the computer readable storage medium for execution by the CPU via the computer readable memory. Advantageously, the system provides for improved machines translations of the source segment by the machine translation module.

In aspects, the system of the present invention further includes program instructions to receive the return amplified match from the machine translation module; remediate the return amplified match to restore the tags and produce a target match; and send the target match to a post-editing module. Advantageously, the system addresses linguistic noise within the translation supply chain to provide the post-editing module with an improved translation of the source segment.

In aspects, the system of the present invention further includes program instructions to obtain post-editing logs generated by the post-editing module, the post-editing logs including information regarding changes made to the target match at the post-editing module; program instructions to analyze the post-editing logs to identify additional linguistic patterns contributing to translation inefficiency; program instructions to generate a predictive model based on the identified additional linguistic patterns; and program instructions to save the predictive model in a store. Advantageously, the system of the present invention enables the generation of predictive models which may be utilized by the system in future source segment translations to address linguistic patterns identified as contributing to translation inefficiency.

BRIEF DESCRIPTION OF THE DRAWINGS

The present invention is described in the detailed description which follows, in reference to the noted plurality of drawings by way of non-limiting examples of exemplary embodiments of the present invention.

FIGS. 6A and 6B are diagrams depicting the data flow of an exemplary source segment through a language translation system in accordance with aspects of the present invention.

DETAILED DESCRIPTION

Figure 1:
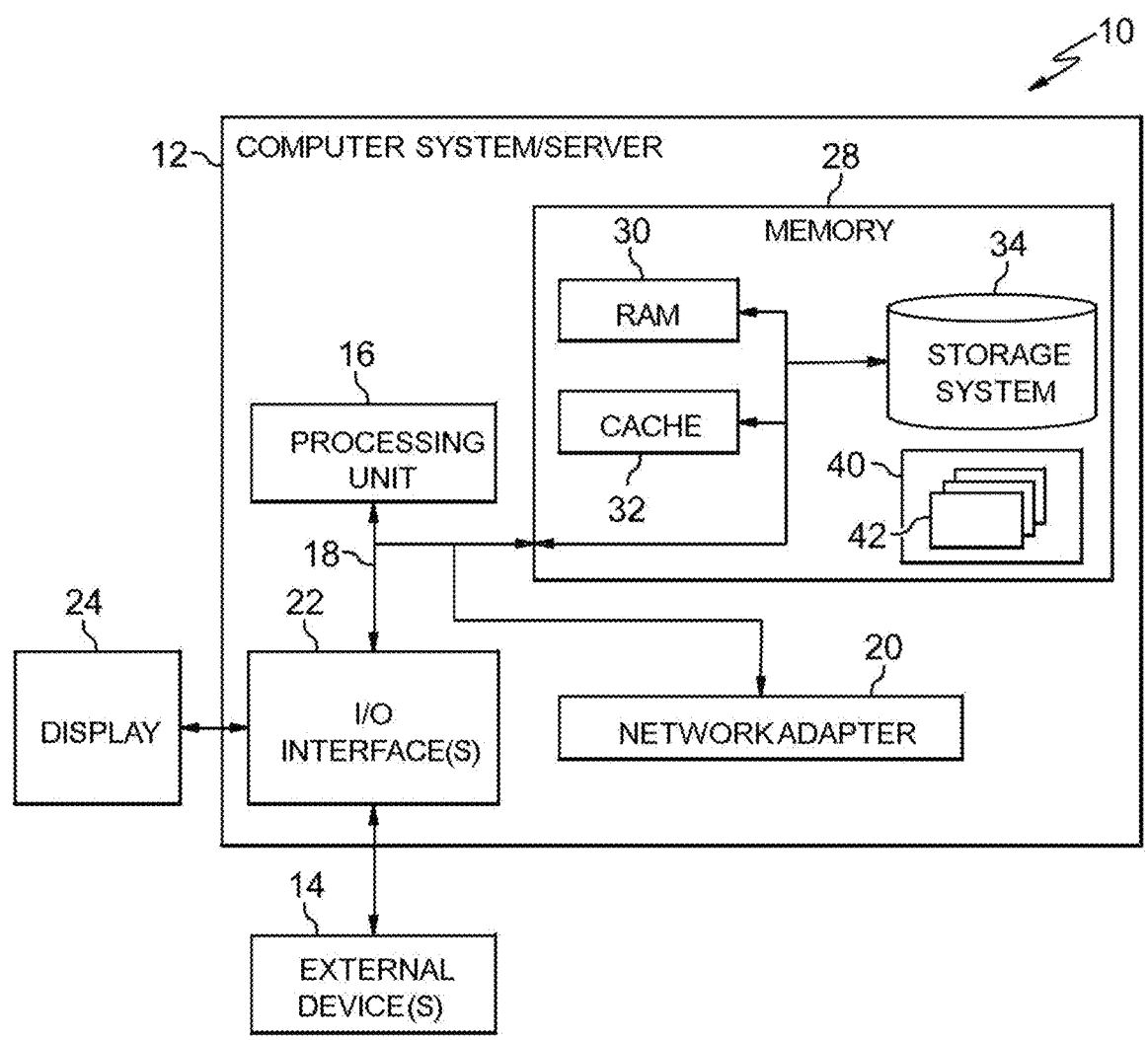
FIG. 1 depicts a computing infrastructure according to an embodiment of the present invention.

The present invention relates generally language translation supply chains and, more particularly, to a translation synthesizer for analysis, amplification and remediation of linguistic data across translation supply chains. The needs for a language translation synthesizer (LTS) system of the present invention can be observed by today's language translation operational teams managing multiple components within a translation supply chain.

In aspects, the LTS of the present invention addresses the technical problem of noise introduced into machine translations of documents by automatically amplifying and remediating source segments of the document as they flow through a translation supply chain. In aspects, the LTS contains a linguistic asset analyzer that measures the noise of embedded grammatical/syntactic/semantic (GSS) patterns to produce tagged source segments, which may then be amplified by an amplifier to produce amplified source segments. The amplified source segments may be used as an input to a machine translation (MT) module, such that output from the MT module is improved. Specifically, Linguistic noise (GSS) patterns in source segments that may introduce noise during a machine translation of the source segments are removed during amplification such that translations from the MT module include less noise. The output from the MT module may then be transferred to a remediator for remediation of the MT module output to create a final remediated translation of the source segments (target match), which is a more accurate translation of the source segments then would be obtained by machine translation of the source segments alone, without amplification/remediation. The target match may then be delivered to a post-editing module for final review and edits. In embodiments, a control panel is provided to enable operators to drill down and visualize the transformation of linguistic assets from source forms to amplified form, and to the MT output and to the target match.

Given today's growth in linguistic components, the LTS of the present invention provides a dynamic method for plugging and configuring the set of Linguistic noise (GSS) patterns and its associated set of amplifiers and remediators using a translation synthesizer markup language (TSML). Collectively, the LTS of the present invention enables the configuration of linguistic integrated components (L-ICs) that optimize productivity per component by analyzing linguistic noise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments, subsystem, or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
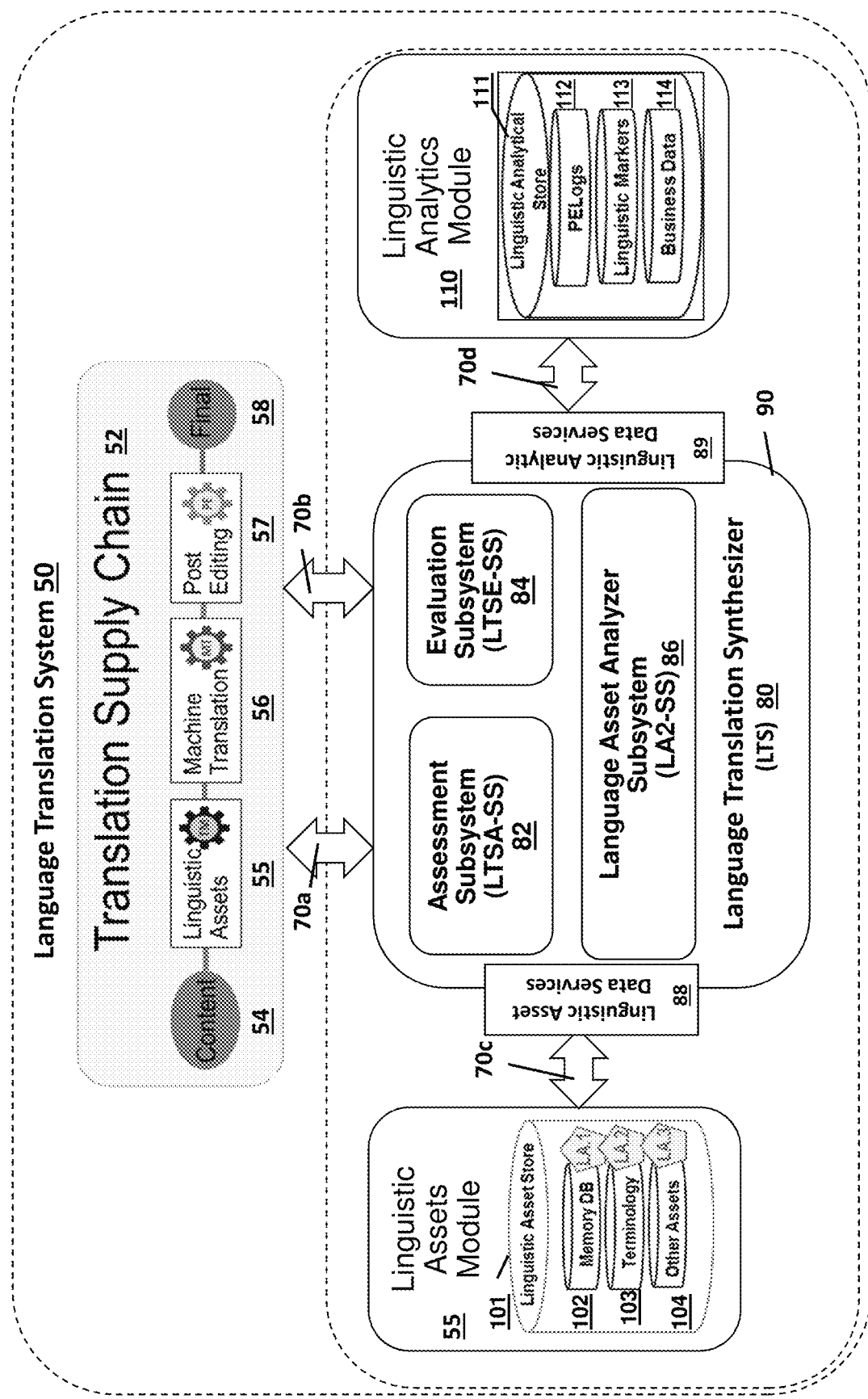
FIG. 2 shows a block diagram of a language translation system in accordance with aspects of the present invention.

FIG. 2 shows a block diagram of a language translation system 50 in accordance with aspects of the present invention, including a translation supply chain 52 in communication with a language translation synthesizer (LTS) 80 via a network connection represented at arrows 70a, 70b. The typical flow of data through a translation supply chain 52 comprises feeding content to be translated 54 (e.g., one or more text-based documents) to a linguistic assets module 55 to determine if the content to be translated matches content which has already been translated in the past. Note that FIG. 1 depicts the linguistic assets module 55 within the supply chain 52, and also shows a more detailed diagram of the linguistic assets module 55 below for ease of reference. If content to be translated matches content which has already been translated, then no translation is necessary and the previous translation of the content may be utilized by the system 50. Next, any remaining content to be translated (i.e. content which was not identified at the linguistic assets module 55 as being previously translated) passes to a machine translation (MT) module 56 for computer translation. In typical translation supply chains, the machine translated content is then passed to a post-editing module 57. In aspects, the post-editing module 57 presents the machine translated content from MT module 56 to a knowledgeable human for approval and/or editing to create final translated content represented at 58. In accordance with aspects of the present invention, machine translated content from MT module 56 is passed to LTS 80 for processing before the processed content is passed to the post-editing module 57.

Still referring to FIG. 2, the translation supply chain 52 may be comprised of one or more computing devices, and each of the one or more computing devices (e.g., a computer system 12 of FIG. 1), may be connected to the network (70a, 70b) via a network adapter (e.g., network adapted 20 of FIG. 1). The one or more computing devices may include one or more special purpose computing devices that are part of the language translation system 50. The translation supply chain 52 may comprise conventional translation supply chain systems and associated hardware and software thereof. In embodiments, the translation supply chain 52 includes a combination of linguistic asset management technology, machine translation technology and human professional linguists. The translation supply chain 52 may be used to perform high-quality translation (e.g., professional level: higher quality assurance than with unaided machine translation) of content such as documents from their original language into one or more target languages.

Still referring to FIG. 2, the network (e.g., 70a, 70b) may be any suitable communication network or combination of networks, such as a local area network (LAN), a general wide area network (WAN), and/or a public network (e.g., the Internet). The LTS 80 may comprise of one or more computing devices represented at 90, and each of the one or more computing devices 90 may comprise elements of the computer system 12 of FIG. 1, and may be connected to the network (e.g., 70a, 70b) via the network adapter 20 of FIG. 1. The one or more computing devices 90 may include one or more special purpose computing devices that are part of the language translation system 50.

In embodiments, the LTS 80 shown in FIG. 2 includes an assessment subsystem (LTSA-SS) 82, an evaluation subsystem (LTSE-SS) 84, a language asset analyzer subsystem (LA2-SS subsystem) 86, a linguistic asset data services module 88 and a linguistic analytic data services module 89. The linguistic asset data services module 88 may include a linguistic asset store component (not shown) configured to store historical language assets. The linguistic analytics data services module 89 may include a linguistic analytic data store component (not shown) configured to store linguistic analytical data (e.g., post-editing logs).

In embodiments, the linguistic assets module 55 is in communication with the LTS 80, either directly or through a network represented by arrow 70c. In aspects, the linguistic assets module 55 includes a linguistic asset store 101, including a memory 102, a terminology database 103 and other assets represented at 104. The assets stored in the linguistic assets module 55 may include: a plurality of high quality and certified previously translated translation memory matches that aid the human professional linguist in making corrections more efficiently in the post-editing module 57; a plurality of "learning translation memory" containing a plurality of previously translated bilingual segments that are used to train and tune the MT module 56 (i.e., services); and, a linguistic database (i.e., Language Dictionary in terminology database 103) for a given domain.

With continued reference to FIG. 2, the linguistic assets module 55 may be an asset optimization component or stage that may parse/break down new content 54 into source segments, and search a repository of historical linguistic assets (e.g., 104) for the best suggested translations per language and per a domain within the language. Linguistic assets module 55 may contain historical translation memories (i.e., bi-lingual segment databases in memory 102), dictionaries (e.g., terminology 103), and/or language specific metadata used to optimize downstream components MT module 56 and/or post-editing module 57. More specifically, the linguistic assets module 55 may manage the delivery of high quality/domain specific linguistic assets 101 optimized for the downstream component MT module 56 and/or post-editing module 57.

The linguistic assets module 55 may generally be any system and/or method involved in the production of potential translation matches (e.g. exact matches, fuzzy matches and/or other matches) corresponding to the plurality of new content source segments used to improve the efficiency of downstream components (e.g., MT module 56). In embodiments, the linguistic assets module 55 uses the plurality of previously translated segments stored in the memory store 102 and/or dictionaries in the terminology store 103 for a given language as an "asset optimization" for downstream components.

Still referring to FIG. 2, in embodiments, a linguistic analytics module 110 is also in communication with the LTS 80, either directly or through a network represented by arrow 70d. In aspects, the linguistic analytics module 110 includes a linguistic analytic store 111, including post-editing logs (PE Logs) 112, a linguistic markers store 113, and business data store 114. In embodiments, linguistic assets from the linguistic assets module 55 are applied via an analytical feedback loop (see FIG. 9) across the translation supply chain 52 by the LTS 80.

Figure 3:
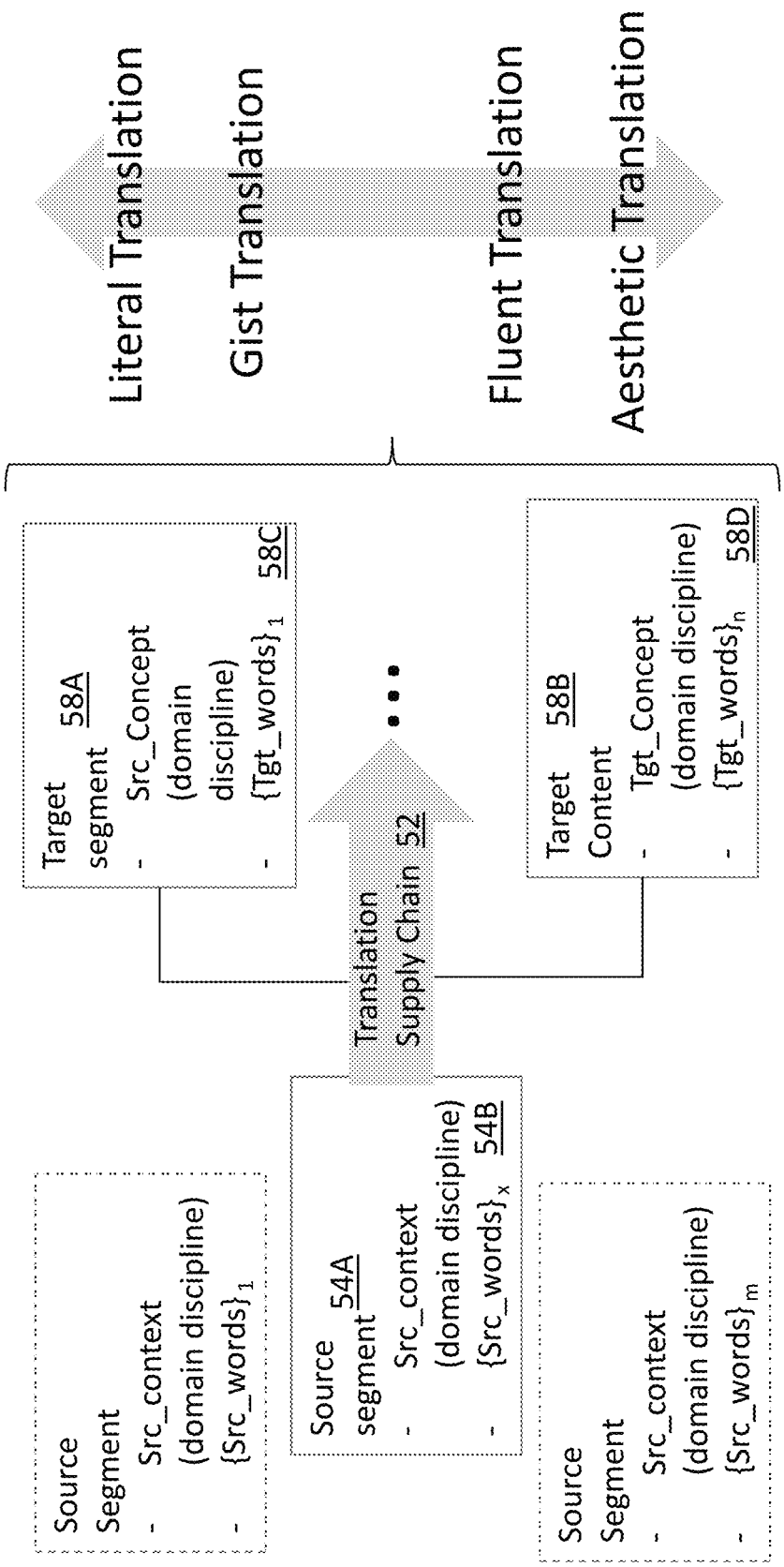
FIG. 3 is an exemplary diagram depicting a source segment flowing through a translation supply chain in accordance with embodiments of the present invention.

FIG. 3 is an exemplary diagram depicting a source segment 54A flowing through a typical translation channel (e.g., translation supply chain 52) to produce 1 of n possible translations or target matches. As used herein, the term source segment is intended to mean a portion of a text or document being translated (content 54), such as a sentence or a partial sentence. FIG. 3 illustrates that the art of translation can be viewed as a translation channel where operations are trying to optimize sending new content (e.g., source content 54A) as a plurality of signals (e.g., src_words 54B) across the translation supply chain 52 to produce the final content 58A or 58B from a plurality of received signals (e.g., tgt_words 58C or 58D). Further, FIG. 3 shows that there may be many ways (1 . . . m) of describing the original concept within a domain discipline as illustrated as source segments 1 through m, but only 1 source segment is fed as input to the translation channel. The term "domain" as used herein is intended to mean a category or subject area, such as human resources, mathematics, science, business, etc. It should be understood that the context of content to be translated can be different depending on the domain discipline associated with the content.

The translation channel (translation supply chain 52) is said to be a noise channel in that for source segment x, there may be many target translations (target segments 1 through n). Skopos Theory states that translation is not just a process of transliteration of one word into its associated translated word, but that there is a functional aspect of translation dealing with producing information in the context and culture of the target audience. Thus, each translation supply chain (e.g., 52) has a service level that can range from "Literal Translation" to "Gist Translation" to "Fluent Translation" and "Aesthetic Translation", where the latter reflects the beauty and art of the source context within the target context. The language translation system 50 of the present invention enables the reliable and sustainable delivery of high quality translation information across a translation channel (e.g., translation supply chain 52) through the use of LTS 80, as will be discussed in more detail below.

Figure 4:
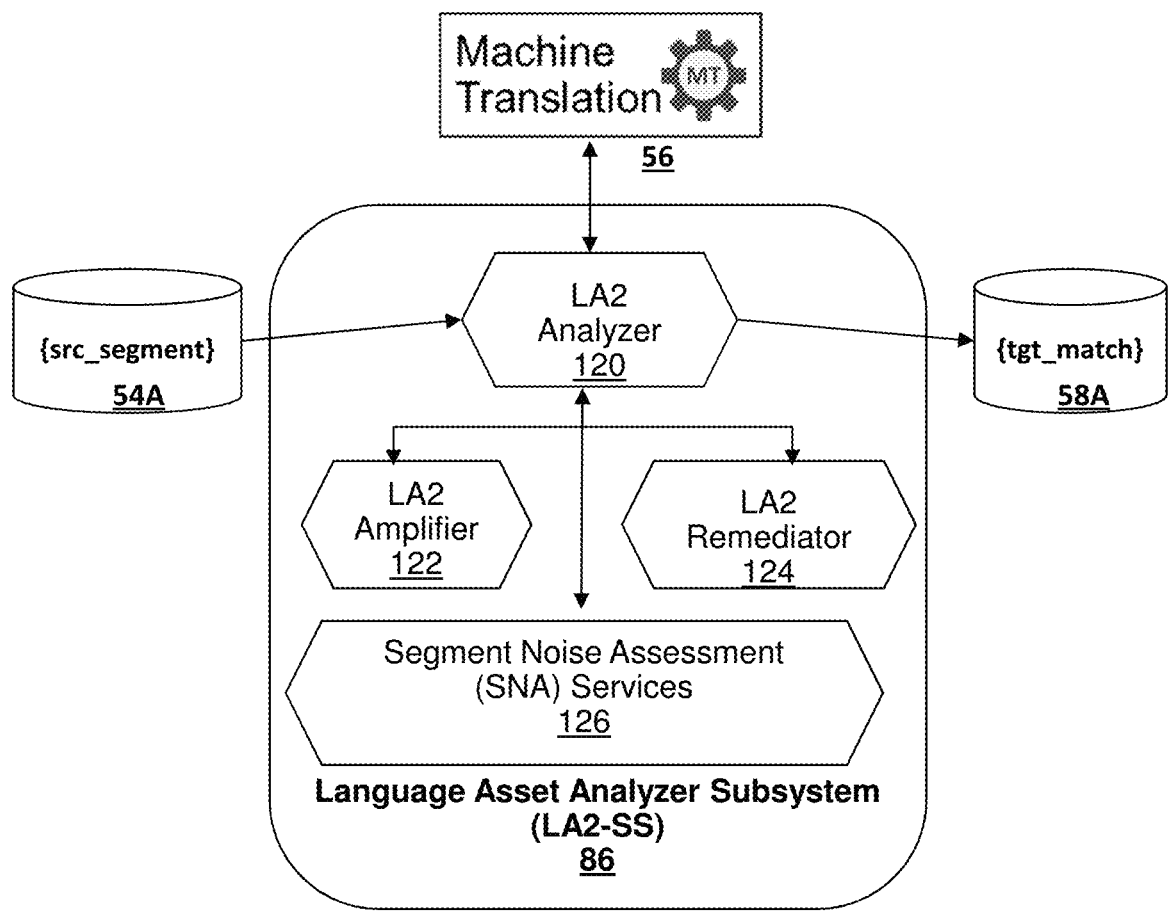
FIG. 4 is a diagram depicting a language asset analyzer subsystem (LA2-SS) in accordance with embodiments of the present invention.

FIG. 4 is a diagram depicting a LA2-SS subsystem 86 of the LTS 80 system of FIG. 2, which may be used for managing and optimizing a translation supply chain (e.g., 52) using business analytics and/or linguistic memory mining, with specific focus on minimizing linguistic noise across the translation supply chain. As used herein, the term "linguistic noise" is an n-dimensional measurable unit composed from 1-N different metrics measured across the translation supply chain 52. A key part of the linguistic noise unit corresponds to the human labor expended (i.e., mechanical and/or cognitive effort) to correct faults in translation memory and/or machine translation matches such that the final translated content is of human fluency quality levels. In aspects, the LA2-SS subsystem 86 enables configuration and plug-and-play integration of L-ICs that specialize in handling GSS and/or other linguistic patterns per language per domain. As used herein, the term "linguistic pattern" is intended to refer to the occurrence of any pattern that introduces linguistic noise (i.e. reduces efficiency of downstream L-ICs within a translation supply chain).

Still referring to FIG. 4, in aspects, LA2-SS subsystem 86 includes an analyzer component (LA2 analyzer) 120, one or more amplifier components (LA2 amplifier) 122, one or more remediator components (LA2 remediator) 124, and a segment noise assessment (SNA) services component 126. In embodiments, the LA2-SS subsystem 86 comprises a collection of various pluggable L-ICs (e.g., 122, 124) for the production of high quality translation segments. In aspects, the LA2-SS subsystem 86 is controlled via a user interface and is fed metrics by a translation-analytical feedback loop (discussed in more detail below with respect to FIG. 9). The set of pluggable L-ICs is typically, but is not limited to, software programs. In aspects, a search segment (src_segment) 54A is received by the LA2 analyzer 120, which produces a target segment (tgt_match) 58A. This translation process will be discussed in more detail below.

Referring to FIGS. 2-4, in aspects, the LTS 80 functions to reduce linguistic noise and improve the overall quality of translations on a consistent basis. More specifically, linguistic markers (GSS markers) are utilized by the LTS 80 to identify and assist in eliminating hidden linguistic noise, especially noise induced from the incorrect handling of a plurality of Linguistic noise (GSS) patterns found in data flowing through the translation supply chain 52 (both new content 54 data as well as linguistic assets module 55 data). By quantifying the linguistic noise found in a source segment (e.g., 54A), the systems and methods outlined herein allow language translation operations to improve the creation of linguistic-enriched training materials.

Advantageously, the LTS 80 of the present configures L-ICs that are optimized by the use of an analytical feedback loop, which will be described below in more detail. While there may be many L-ICs within the art of linguistic translation, there are no existing single system/methods integrating synthesized translations using an analytical feedback loop (see FIG. 9) based on a uniform measurement of linguistic noise across a set of Linguistic noise (GSS) patterns.

The set of sentences within linguistics is without practical limits for any given language. In embodiments, optimizing a translation supply chain (e.g., 52) involves the integration of more and more specialized L-ICs that are cognizant of the Linguistic noise (GSS) patterns per language and per domain (i.e., are able to properly measure, analyze and amplify/handle Linguistic noise (GSS) patterns, thus reducing linguistic noise).

Figure 5A:
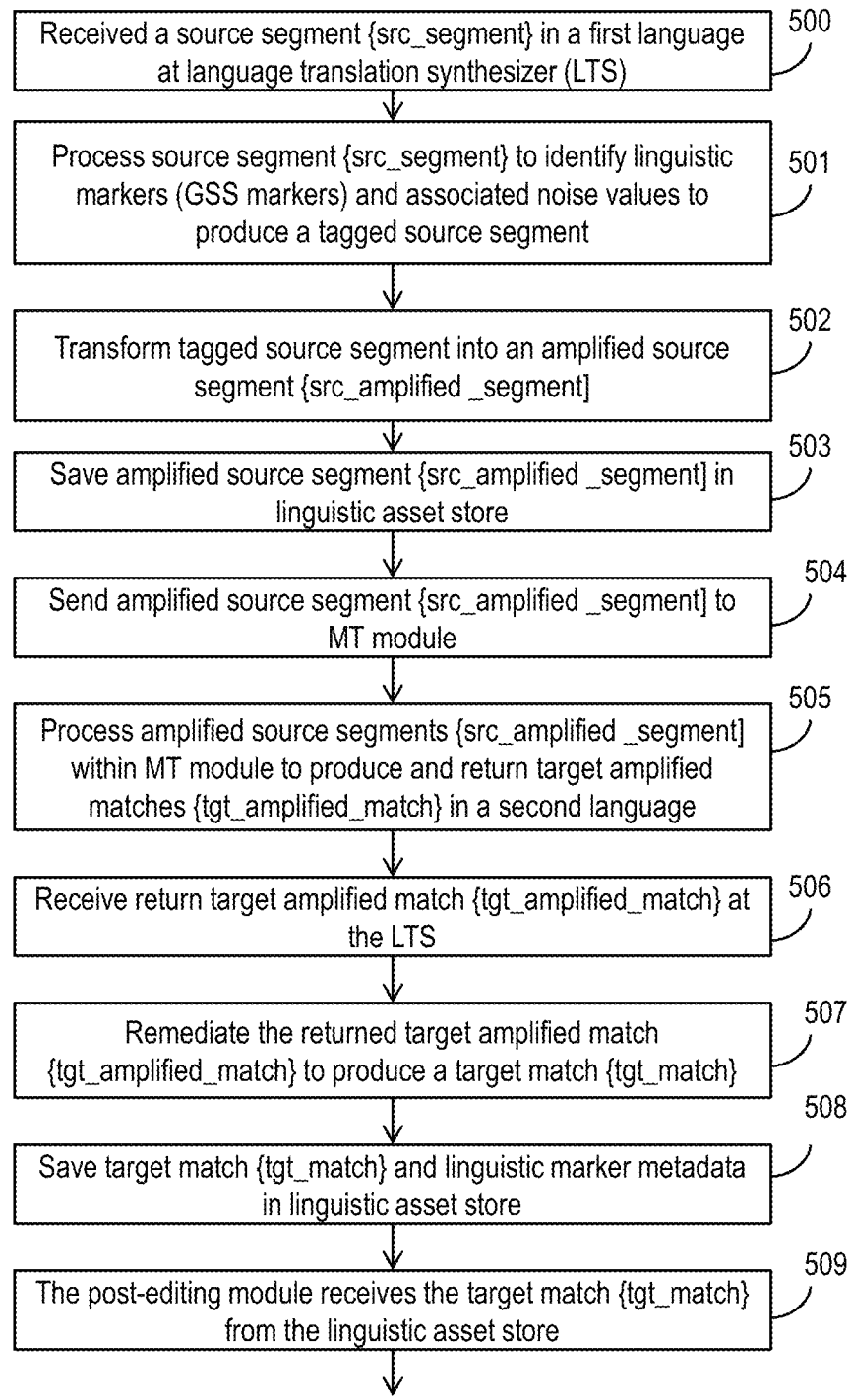
FIGS. 5A and 5B are flowcharts of steps of a method in accordance with aspects of the invention.
Figure 5B:
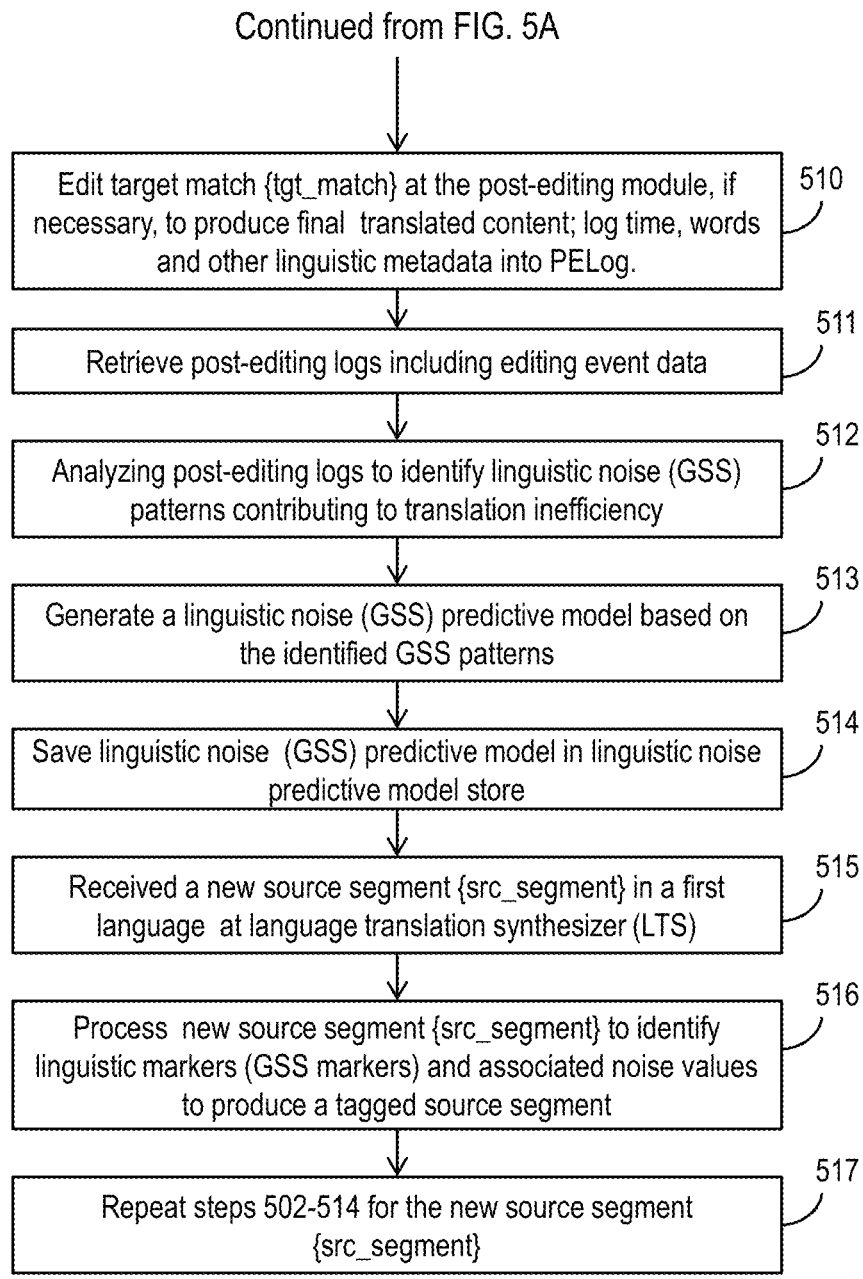

FIGS. 5A and 5B show a flowchart of steps of a method in accordance with aspects of the invention. Steps of the method of FIGS. 5A and 5B may be performed in the language translation system 50 illustrated in FIG. 2, and are described with reference to elements shown in FIG. 2.

Figure 6A:
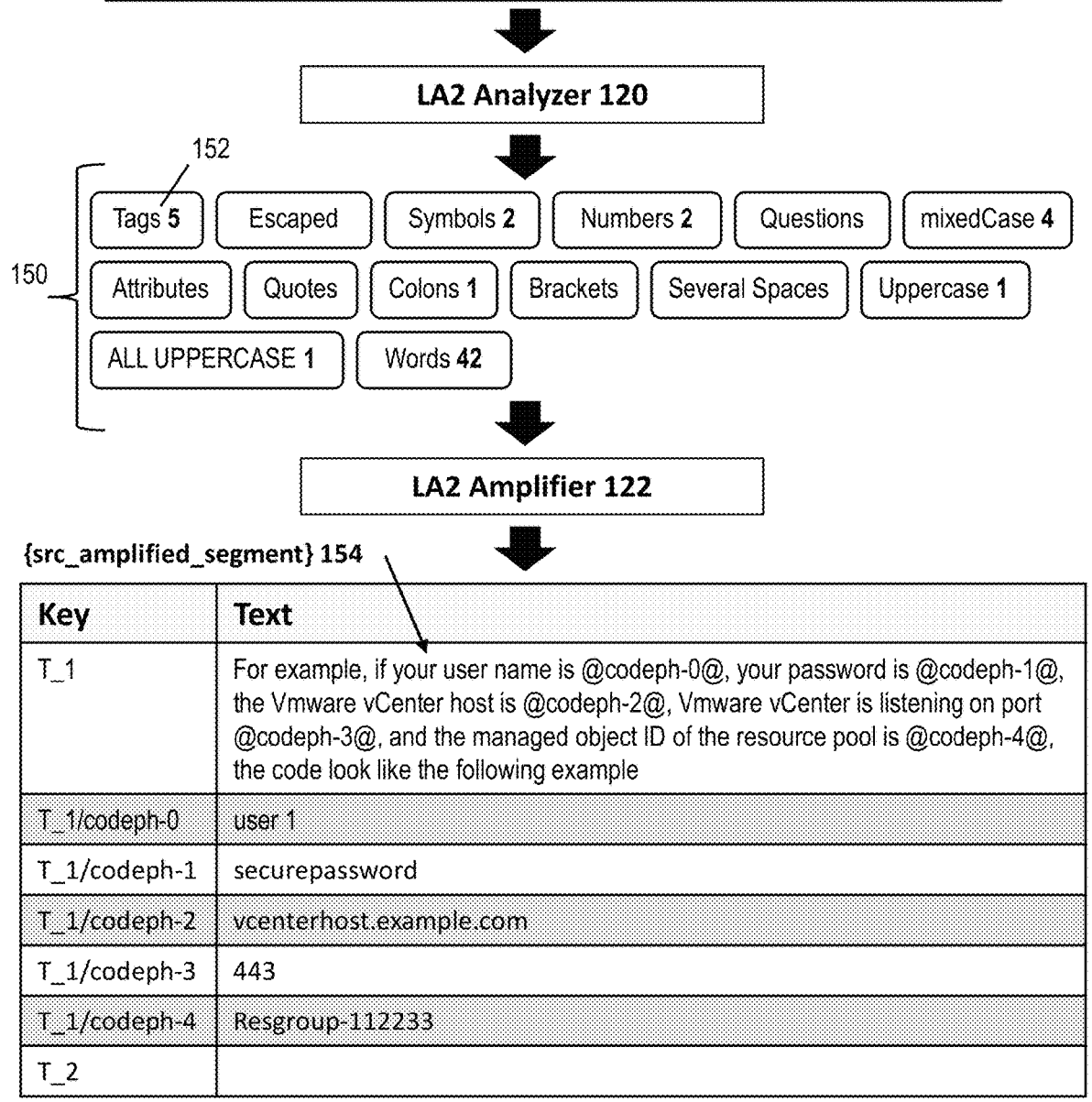

FIGS. 6A and 6B are exemplary diagrams depicting the data flow of a source segment 54A through a system 50 of the present invention, and will also be referenced in the discussion of the method steps of FIGS. 5A and 5B.

Referring to FIG. 5A at step 500, a source segment {src_segment} 54A in a first language is received at the LTS 80. In aspects the source segment {src_segment} 54A is received from the linguistic assets module 55 of the translation supply chain 52. While depicted as a portion of a sentence in FIG. 6A, it should be understood that a source segment can be a word, sentence, portion of a sentence, paragraph, or any other desirable portion of content 54.

In step 501, the source segment {src_segment} 54A is processed by the LTS 80 to compute linguistic markers (GSS markers) associated with the source segment. The linguistic markers of a source segment are represented by the reference 150 in FIG. 6A. In aspects of the invention, the source segment {src_segment} 54A is processed by the LA2 analyzer 120 of LA2-SS subsystem 86 shown in FIG. 4 to produce the linguistic markers of a source segment 150.

FIG. 6A depicts an exemplary English source segment {src_segment} 54A, and an associated linguistic markers of a {src_segment} 54A produced by LA2 analyzer 120. More specifically, FIG. 6A depicts linguistic markers (GSS markers) 152 including: Tags Escaped, Symbols, Numbers, Questions, mixedCase, Attributes, Quotes, Colons, Brackets, Several Spaces, Uppercase, ALL UPPERCASE, and Words. The numbers displayed next to each GSS marker 152 reflect a value quantifying the noise resulting from each GSS marker, with the exception of the "Words" marker, which displays the number of words that do not include one of the other linguistic markers (GSS markers).

In step 502 of FIG. 5A, the linguistic markers of a source segment (e.g., 150) are embedded as metadata within the {src_segment} 54A and portions of the source segment may be transformed to produce an amplified source segment {src_amplified_segment}. The term amplified as used herein is intended to mean transformed in a manner that addresses a problem. In aspects of the invention, the source segment 54A is transformed by the LA2 amplifier 122 shown in FIG. 4. See also the exemplary amplified source segment {src_amplified_segment} 154 in FIG. 6A. In embodiments, the LA2 amplifier 122 breaks down the source segment (e.g., 54A) into a tree structure (not shown) before transforming the tagged source segment into translatable content (e.g., {src_amplified_segment} 154). In aspects, markers 152 are inserted by the LA2 amplifier 122 to replace tags and create the amplified source segment {src_amplified_segment} 154. In aspects, the tags are replaced metadata that is easier for a MT module 56 to digest (process). Additional details regarding the manner in which LA2 amplifier 122 will be discussed in more detail below with respect to FIGS. 7-10.

In step 503 of FIG. 5A, the amplified source segment of Step 502 (e.g., {src_amplified_segment} 154 of FIG. 6A) is saved in the linguistic asset store 101.

In step 504 of FIG. 5A, the translatable content of the amplified source segment of Step 503 (e.g., {src_amplified_segment} 154 of FIG. 6A) is sent to a MT module (e.g., 56) for translation. In aspects, the translatable content of {src_amplified_segment} 154 output from the LA2 amplifier 122 is passed onto the MT module 56 of the translation supply chain 52 with certain Linguistic noise (GSS) patterns having been cleaned or transformed into an amplified form (e.g., see the {src_amplified_segment} 154 in FIG. 6A).

In step 505 of FIG. 5A, the MT module (e.g., 56) processes the amplified source segment (e.g., {src_amplified_segment} 154 of FIG. 6A) to produce a translated amplified source segment or return amplified match {tgt_amplified_match} (e.g., {tgt_amplified_match} 156 in FIG. 6B) in a second language. FIG. 6B depicts a continuation of the exemplary source segment flow diagram of FIG. 6A. An exemplary Spanish translation or {tgt_amplified_match} 156 from the MT module 56 is depicted.

In step 506 of FIG. 5A, the returned target amplified match {tgt_amplified_match} (e.g., {tgt_amplified_match} 156 of FIG. 6B) is received by the LTS 80 for further processing. In aspects, the LTS 80 receives the target amplified match {tgt_amplified_match} 156 from the MT module 56 through the network connection 70b.

In step 507, the return target amplified match (e.g., {tgt_amplified_match} 156 of FIG. 6B) is processed (remediated) to produce a {tgt_match} (e.g., {tgt_match} 58A of FIG. 6B). In aspects, upon return from the MT module 56, the target amplified match {tgt_amplified_match} 156 is routed through the LA2 remediator 124 to remediate the target amplified match {tgt_amplified_match} 156 into the {tgt_match} 58A that is improved and ready for the post-editing device 60. In one exemplary case, as shown in the Example of FIG. 6A, the LTS 80 may act as a general tag handler wherein tags are removed by amplification and then restored by remediation.

In step 508, the target match (e.g., {tgt_match} 58A of FIG. 6B) is saved in the linguistic asset store 101.

In step 509, a post-editing module 57 of the translation supply chain 52 receives the target match (e.g., {tgt_match} 58A of FIG. 6B) from the linguistic asset store 101.

Turning to FIG. 5B, in step 510, the target match (e.g., {tgt_match} 58A of FIG. 6B) is edited/corrected, if necessary, at the post-editing module (e.g., 57) to produce final translated content. It should be understood that a knowledgeable translator at the post-editing module 57 may detect errors in the translation of the target match {tgt_match} 58A, such as context errors. Editing of the {tgt_match} 58A by the post-editing module 57 creates post-editing logs (PE Logs 112).

In step 511, PE logs 112 are collected upon completion of step 510. The PE logs 112 include editing event data regarding any editing/changes made to the target match 58A at the post-editing module. For example, if a human translator sees that the target match 58A includes a translation error, the human translator will edit the target match 58A to correct the translation error, and a PE log 112 will be generated including information regarding the correction. In aspects, the LTS 80 retrieves the PE logs 112 from the post-editing module 57 and stores them in the linguistic analytics module 110.

At step 512, the LTS 80 analyzes PE logs 112 to identify Linguistic noise (GSS) patterns contributing to translation inefficiency.

Figure 9:
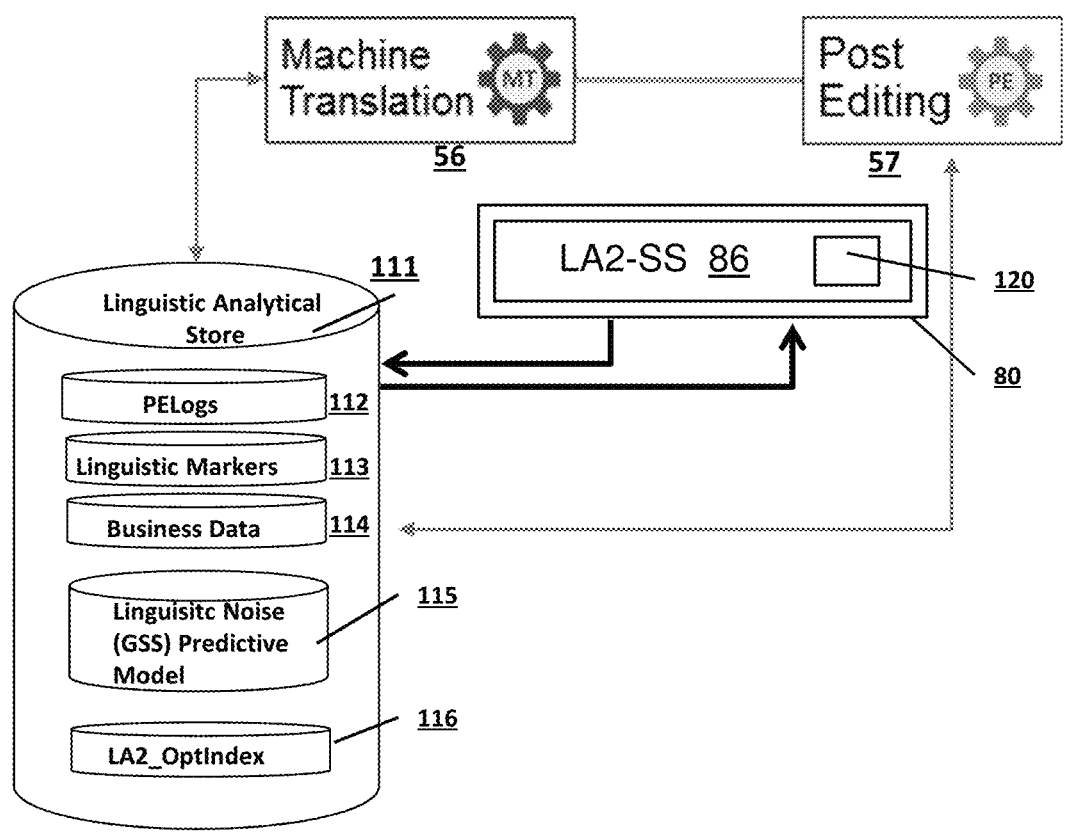
FIG. 9 depicts an analytic feedback loop in accordance with aspects of the present invention.

At step 513, the LTS 80 generates a GSS predictive model 115 (see the GSS predictive model 115 of FIG. 9). The GSS predictive model 115 enables the LA2 analyzer 120 to identify the Linguistic noise (GSS) patterns of step 512 that caused translation inefficiencies and invoke associated amplification steps to address the inefficiencies.

At step 514, the LTS 80 saves the linguistic noise (GSS) predictive model in a linguistic noise (GSS) predictive model store 115, FIG. 9, within the linguistic asset store 110.

At step 515, the LTS 80 receives a new source segment {src_segment} for translation.

At step 516, the LTS 80 processes the new source segment {src_segment} to identify linguistic markers and associated noise values to produce a new tagged source segment. In aspects, the LA2 analyzer 120 utilizes the GSS predictive model of step 513 to identify and prioritize the {Linguistic noise (GSS) pattern} needing translation amplification in the new source segment {src_segment}.

At step 517, the LTS 80 proceeds to repeat steps 500-514 for the new source segment {src_segment}. It should be understood that steps 500-517 can be repeated any number of times, whereby additional translation knowledge could be continuously added to the system to enable more efficient amplification and remediation of source segments. In FIG. 9, an aspect can be seen that the system 50 provides an analytical feedback loop wherein linguistic noise (GSS) predictive models generated during the translation of particular content 54 will add to the store of translating knowledge within the linguistic assets module 55, enabling more efficient use of LA2-SS subsystem 86.

Figure 7:
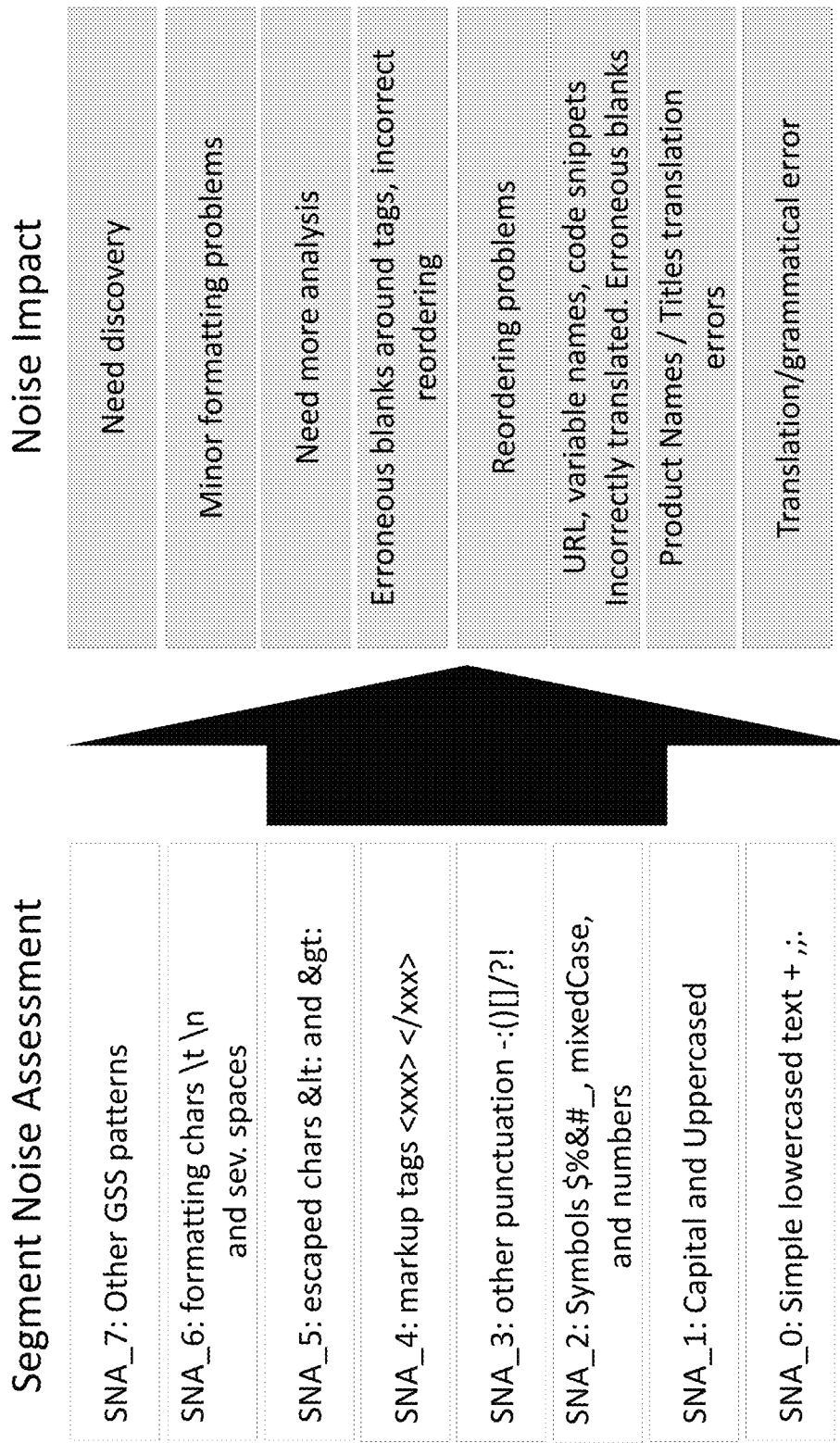
FIG. 7 depicts segment noise categories that may be assessed by the LA2 analyzer in accordance with aspects of the present invention.

Additional details of the method steps described above will now be discussed with reference to FIGS. 7 and 8. FIG. 7 depicts exemplary segment noise categories that may be assessed by the LA2 analyzer 120 in step 502 of the above-discussed method. The SNA (Segment Noise Assessment) services component 126 (depicted in FIG. 4) defines one exemplary system and method used to quantify a GSS marker for each SNA category. Each SNA category may be associated with different types of linguistic noise patterns.

Still referring to FIG. 7, to illustrate the value of quantifying Linguistic noise (GSS) patterns, the SNA_1 Capital and Uppercase category may cause faults in a MT module (e.g., 56) because the MT module may not have been trained with new product names, causing the MT module 56 to alter the case of certain words. Another illustration is with the SNA 4 markup tags which may not exist in MT models of a MT module due to new tags being introduced. The issue of inefficiency is not only with these cases but with the surrounding text that may be impacted since such cases do not exist in the MT models of the MT module. Thus, the detection and amplification (cleaning) of these cases allow an MT module to properly translate the surrounding text and leave these new cases for human post-editing.

The SNA services component 126 shown in FIG. 4 is defined to classify and quantify the linguistic noise (GSS) patterns into an index value 0.0 to 1.0 based on the occurrence of a respective Linguistic noise (GSS) pattern. In aspects, the SNA services component 126 is defined to be called per segment (e.g., 54A) per Linguistic noise (GSS) pattern returning an SNA index value [0.0-1.0]. The value represents the noise within the segment caused by the occurrences of the respective Linguistic noise (GSS) pattern. In aspects, the SNA services 126 may return 0.0 if there is no occurrence of the Linguistic noise (GSS) pattern within a segment (i.e. there is no potential noise), or may return 1.0 (signifying the segment has the maximum noise possible given the number of words within the segment).

Some Linguistic noise (GSS) patterns that may be handled by LA2-SS subsystem 86 include:

a. sna_alnum—alphanumeric characters;
b. sna_alpha—alphabetic characters;
c. sna_digit—digits;

d. sna_case—cased characters [4] in the string that are lowercase (default). A value of 0.0=lower, a case of 1.0=upper, x (0.0<x<1.0)=mixed case;
e. sna_punct—assigns an index based on the occurrence of punctuation characters. This Linguistic noise (GSS) pattern may assign different weights depending on specific punctuation characters. Below is an exemplary weighting of punctuation characters:
Level0==>[',','';'/'.']
Level1==>[$%&#]
Level2==>[:( )[ ]/?!]
Level9==>[all other punctuation symbols];
f. sna_space—whitespace characters [\t, \n, sev. spaces];
g. sna_tags—markup tagging (<xxx> . . . </xxx>, inclusive of tag characters and text within tags);
h. sna_escape—markup escapes [<. and >.]; and
i. sna title—characters contained in titlecased string—uppercase characters may only follow uncased characters and lowercase characters.

Each Linguistic noise (GSS) pattern is defined by one and only one SNA category and its respective GSS marker value is composed by a plurality of SNA service functions.

Figure 8:
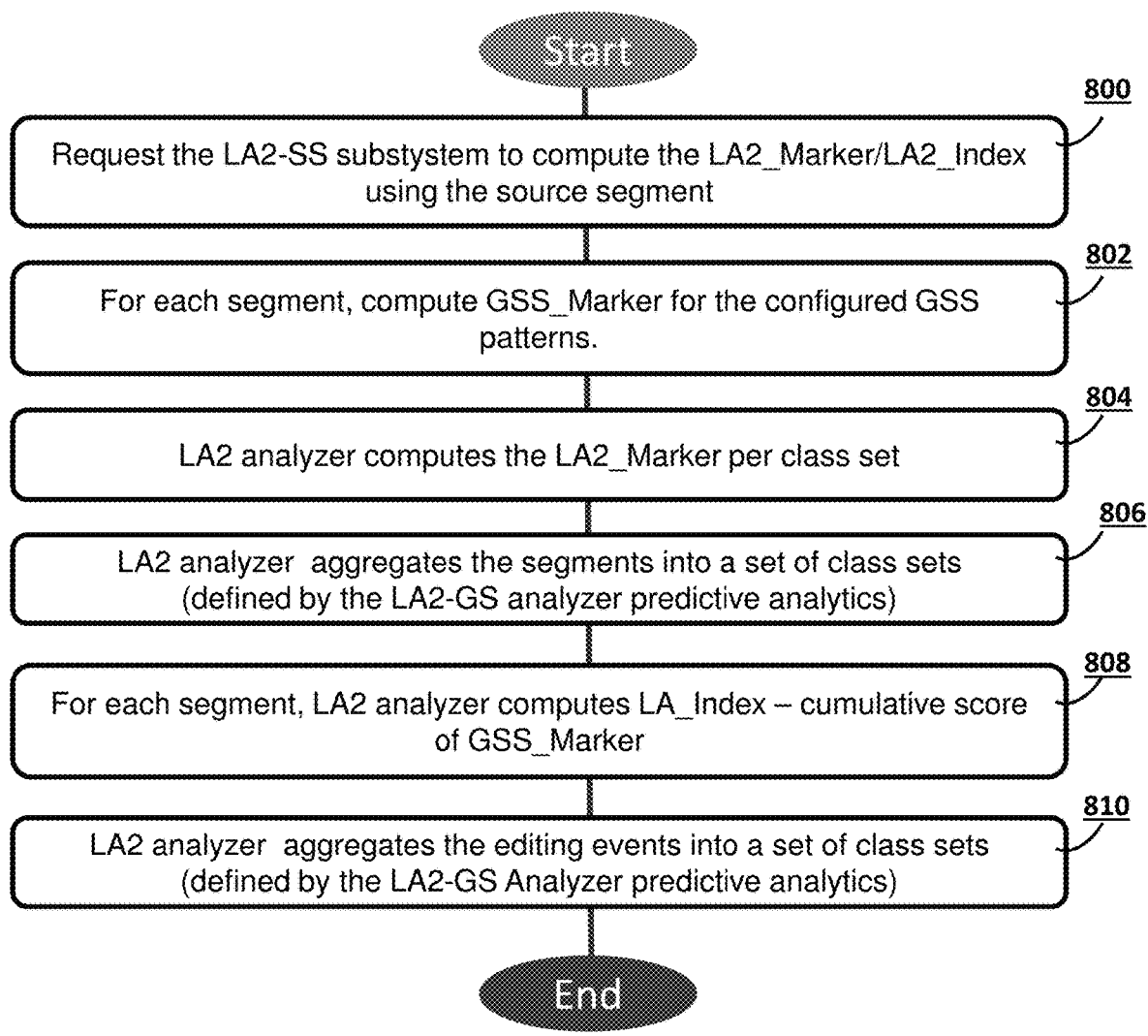
FIG. 8 depicts a flowchart for a process performed by the LA2 analyzer in accordance with embodiments of the present invention.

FIG. 8 depicts a flowchart for a process that the LA2 analyzer 120 component may perform to compute a GSS marker value (GSS_Marker), an index value (LA2 Index) and an overall class set marker value (LA2_Marker) given a set of source segments {src_segment} 54A and associated target segments {tgt_match} 58A.

In step 800, the LTS 80 sends a request to the LA2-SS subsystem 86 to compute LA2 Marker/LA2_Index using the {src_segment} 54A.

In step 802, for each segment (54A), the LA2-SS subsystem 86 computes the GSS marker for the configured Linguistic noise (GSS) patterns using the SNA services component 126. The number of GSS markers, n, is defined by the configuration of the LA2 analyzer 120 component. The following formula may be used to compute the GSS_Marker value for a given Linguistic noise (GSS) pattern i per src_segment 54A.

$$GSS\_marker_{src}^{i}=SNA\_index_{src}^{i} \times SNA\_weight^{i}$$

The SNA_index is a value computed by calling one or more of the SNA services where $$SNA\_index\frac{i}{src}$$

identifies a specific Linguistic noise (GSS) pattern. A GSS marker value may range from 0.0 to 1.0. Furthermore, each GSS marker (Linguistic noise (GSS) pattern) is weighted by SNA_weight$^i$ such that if:

$$GSS\_Weight=\Sigma_{i=1}^{n} SNA\_weight^{i}$$

then GSS_Weight=maximum noise value. For an exemplary embodiment, this disclosure may define the range of GSS_Weight to be 0.0 to 1.0.

In step 804, the LA2 analyzer 120 computes the LA2_Index per segment for {src_segment} 54A and/or {tgt_match} 58A using the {GSS marker}:

$$LA2\_Index_{src} = \sum_{i=1}^{n} GSS\_marker_{src}^{j}$$

$$LA2\_Index_{gt} = \sum_{i=1}^{n} GSS\_marker_{tgt}^{j}$$

The LA2_Index value reflects the 'total potential noise' that may exist per segment, where 0.0 reflects a perfect segment, i.e. has no potential noise from the Linguistic noise (GSS) pattern. The maximum value will be GSS_Weight (see GSS_Weight assumption).

TABLE 1

| GSS_Weight Assumption | |
|---|---|
| Range of values | Segment GSS_marker$_{src}$ |
| SNA_index | 0.0-1.0 |
| SNA_weight | 0.0-([0-100%] of GSS_Weight) |
| LA2_Index | 0.0-GSS_Weight |

In step 806, the LA2 analyzer 120 classifies and aggregates the segments into the set of class set {c}, where {c} is defined by configuration of the LA2 analyzer 120 and updated via an LA2 analyzer 120 predictive analytical feedback loop—FIG. 9.

In step 808, the LA2 analyzer 120 classifies and aggregates editing events from the PE logs 112 into the set of class set {c}, where {c} is defined by configuration of the LA2 analyzer 120 and updated via an LA2 analyzer 120 predictive analytical feedback loop.

In step 810, the LA2 analyzer 120 computes the LA2_Marker for the class sets {c}. In one embodiment, the LA2 analyzer 120 computes the LA2_Marker for the class sets (s,m) where m={matchtype} (exact match class set event data, fuzzy match class set event data, machine translation class set event data) and s={segment scope} (small segment class set event data, medium segment class set event data, large segment class set event data). The segment scope represents the beginning of segment sizes where: small is 1-4 words; medium is 5-14 words; and large or complex is >14 words. In addition, the segment noise LA2_Marker is a function of the source LA2_Index and target LA2_Index values such that:

$$LA2\_marker_{s}^{m}=SNA\_src\_tgt(src\_LA2\_Index_{s}^{m}, tgt\_LA2\_Index_{s}^{m})$$

where the function "'SNA_src_tgt" is defined to return a noise value that ranges per the following Table 2.

TABLE 2

| Measuring Linguistic noise (GSS) patterns | | | |
|---|---|---|---|
| Target noise tgt_LA2_Index | Source Noise src_LA2_Index | Segment Marker LA2_Marker | Description |
| 0.0 | 0.0 | 0.0 | Minimum/No noise in source & target. |
| 0.0 | 1.0 | 0.0 | Known Linguistic noise (GSS) patterns, cleaned to no noise generated in target. |

TABLE 2-continued

Measuring Linguistic noise (GSS) patterns

| Target noise tgt_LA2_Index | Source Noise src_LA2_Index | Segment Marker LA2_Marker | Description |
|---|---|---|---|
| 0.0 < x < 1.0 | 0.0 < x < 1.0 | 0.0 < x < 1.0 | "noise from mixed patterns" i.e. mix of ineffective (close to 0.0) and/or unknown Linguistic noise (GSS) patterns (close to 1.0). |
| 1.0 | 1.0 | 1.0 | Maximum noise, unknown Linguistic noise (GSS) patterns. |

Upon further observation, the cases of "noise from mixed patterns" reflect the greatest challenge. In one embodiment, the LTS 80 may be configured with an advanced LA2 analyzer 120 that may analyze and visualize the contribution of each $SNA\_Index^i$ to the overall class set LA2_Marker value. The visualization of Linguistic noise (GSS) patterns in a LTS 80 helps optimize a translation supply chain. For example, in a highly optimized LTS 80, the expected pattern across class sets analyzing segment scope (small, medium, complex) should yield a well-known pattern:

LA2_Marker(Small)<LA2_Marker (Medium)<LA2_Marker(Complex)

with all other linguistic markers being equal across the segment scope. The LTS 80 enables the language translation operations to quickly visualize and diagnose which Linguistic noise (GSS) patterns need corrective action.

FIG. 9 depicts an analytic feedback loop in accordance with aspects of the present invention. More specifically, FIG. 9 depicts the LA2-SS subsystem 86 (also shown in FIGS. 2 and 4) and data flow of a predictive analytical feedback loop of the present invention. In accordance with step 511 of FIG. 5B, PE Logs 112 are collected after post-editing procedures are conducted at the post-editing module 57. In aspects, the LA2-SS subsystem 86 performs analysis on a periodic basis, updating GSS predictive models 115 and storing them onto the linguistic analytical store 111.

Figure 10:
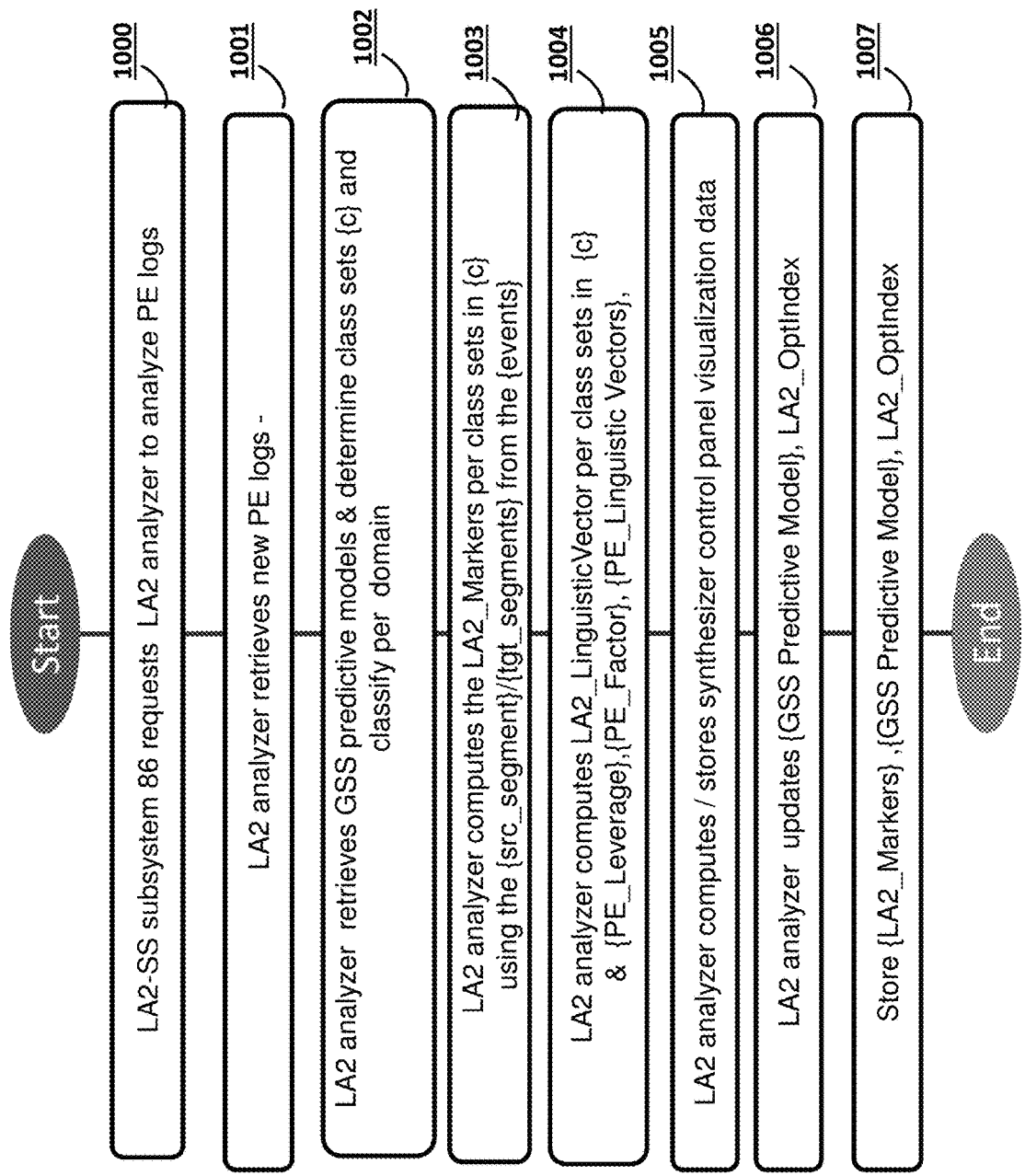
FIG. 10 depicts a flowchart for process performed by the LA2-SS in accordance with aspects of the present invention.

FIG. 10 depicts a flowchart for the process that LA2-SS subsystem 86 may perform to measure core metrics exhibited over a plurality of PE Logs 112, specifically the LA2_Marker value, a linguistic vector value LA2_LinguisticVector, and the linguistic noise associated with a GSS marker. In particular, the LTS 80 may invoke the LA2-SS subsystem 86 with a plurality of PE Logs 112 collected over a period of time to perform the analysis.

In step 1000, the LA2-SS subsystem 86 calls the LA2 analyzer 120 component to perform periodic analysis of the PE logs 112.

In step 1001, the LA2 analyzer 120 retrieves new PE logs 112 from the linguistic analytics module 110 using the linguistic analytic data services 89 (shown in FIG. 2).

In step 1002, the LA2 analyzer 120 classifies the editing events from the PE logs 112 {events} per domain.

In step 1003, the LA2 analyzer 120 computes $LA2\_Marker_s^m$ using the {src_segment} and {tgt_segment} from the plurality of the editing events per domain using, for example, the method described with respect to FIG. 8. For each class set in {c}, the LA2 analyzer 120 computes the PE_Leverage, the PE_Factor and the PE_LinguisticVector.

In one embodiment, the LA2 analyzer 120 aggregates all the editing events into class sets where the major key is "Language" and the class set is defined over the space of (s,m) where m:={match type} (e.g., exact match class set event data; fuzzy match class set event data; machine translation class set event data) and s:={segment scope} (e.g., small segment class set event data; medium segment class set event data; large segment class set event data). The notation class set (s,m) is used to denote the plurality of class sets over these 2 dimensions.

In one embodiment, the $LA2\_Marker_s^m$ may use the source segment (src_segment 54A) and the target segment (tgt_match 58A) to analyze and benchmark the noise produced across all class sets (s,m) of the translation supply chain (e.g., 52). In another embodiment, the $LA2\_Marker_s^m$ may use the source segment (src_segment 54A) and (tgt_match 58A) to assess the noise originating from the matches generated per class set (s,m).

In step 1004, the LA2 analyzer 120 may compute the $LA2\_LingusiticVecto_s^m$ over the plurality of editing events and the plurality of class sets {c}. In each of the following embodiments, {c} may span the set of (s,m), i.e. s={segment scope} (e.g., small segment class set event data; medium segment class set event data; large segment class set event data) and m={match type} (e.g., exact match class set event data; fuzzy match class set event data; machine translation class set event data).

In step 1005, the LA2 analyzer 120 analyzes the class set markers and stores the Linguistic noise (GSS) pattern visualization data for the language translation operations. In one embodiment, a control panel interface shown in FIG. 14 can be utilized by operations (operators) to view the Linguistic noise (GSS) pattern visualization data.

In step 1006, the LA2 analyzer 120 analyzes the class sets of LA2_LinguisticVectors, LA2_Markers against other linguistic markers to identify the patterns where Linguistic noise (GSS) patterns are contributing to the inefficiency of the translation supply chain 52. The LA2 analyzer 120 then constructs a GSS predictive model 115 and respective GSS regression functions that can be used by the LA2 amplifier 122 and LA2 remediator 124. In one embodiment, the LA2 analyzer 120 may identify that certain markup tags are causing the MT module 56 to produce bad MT matches because the plurality of new tags is unknown with the MT module 56 training. A GSS predictive model 115 may be created such that the analyzer 120 detects the tags Linguistic noise (GSS) pattern in any new context and then invoke a "tag-aware" LA2 amplifier 122 to perform translation amplification on the tag Linguistic noise (GSS) patterns before calling the MT module 56. Upon return from the MT module 56, a "tag" LA2 remediator 124 then remediates the amplification and delivers the translation with the correct original tags.

In an exemplary embodiment, the LA2 analyzer 120 uses the GSS predictive models to identify a LA2_OptIndex 116 (depicted in FIG. 9) by correlating the LA2_LinguisticVectors with the set of Linguistic noise (GSS) patterns (see Table 2). The LA2_OptIndex is then said to be index value X within the range of LA2_Marker values (0.0 to 1.0) that is computing the noise:word ratio:

$$LA2\_OptIndex_c = (LA2\_Marker_c / Sum\_Words_c) / Sum\_Words_{All}$$

where c is a defined class set (e.g. {match type} [exact match class set event data, fuzzy match class set event data, machine translation class set event data], {segment scope} [small segment class set event data, medium segment class set event data, large segment class set event data]). If the noise ($LA2\_Marker_c$) is 0.0, then the $LA2\_OptIndex_c$ is 0.0. If the noise ($LA2\_Marker_c$) is 1.0, then the $LA2\_OptIndex_c$ is a percentage of words in the class set c. In a highly optimized translation supply chain, the $\Sigma LA2\_OptIndex_c$ would approach 0.0. In a highly inefficient translation supply chain with little knowledge or handling of Linguistic noise (GSS) patterns, the $\Sigma LA2\_OptIndex_c$ would approach $Sum\_Words_{All}$. This example demonstrates how a LTS 80 that connects a LA2-SS subsystem 86 in a feedback loop across the entire translation supply chain can monitor and quantify the efficiency in handling Linguistic noise (GSS) patterns, i.e. the LA2_OptIndex value is a reflection of noise from the {Linguistic noise (GSS) pattern} across the translation supply chain.

Referring again to FIG. 10, in step 1007, the LA2 analyzer 120 uses the linguistic analytic data services 89 to store per domain the plurality of GSS predictive models 115 within the linguistic analytical store 111. See FIG. 9. In one embodiment, the LA2 analyzer 120 uses the linguistic analytic data services 89 to store, per domain and per class set {c}, the $LA2\_Marker_c$, $LA2\_LinguistcVectors_c$, and $LA2\_OptIndex_c$ within the linguistic analytical store 111.

In one embodiment, the $LA2\_LingusiticVector_s^m$ may be computed using a 2-dimensional formula:

$$LA2\_LinguisticVector_c = \sqrt{LA2\_Marker_c^2 + PE\_LinguisticVector_c^2}$$

Figure 11:
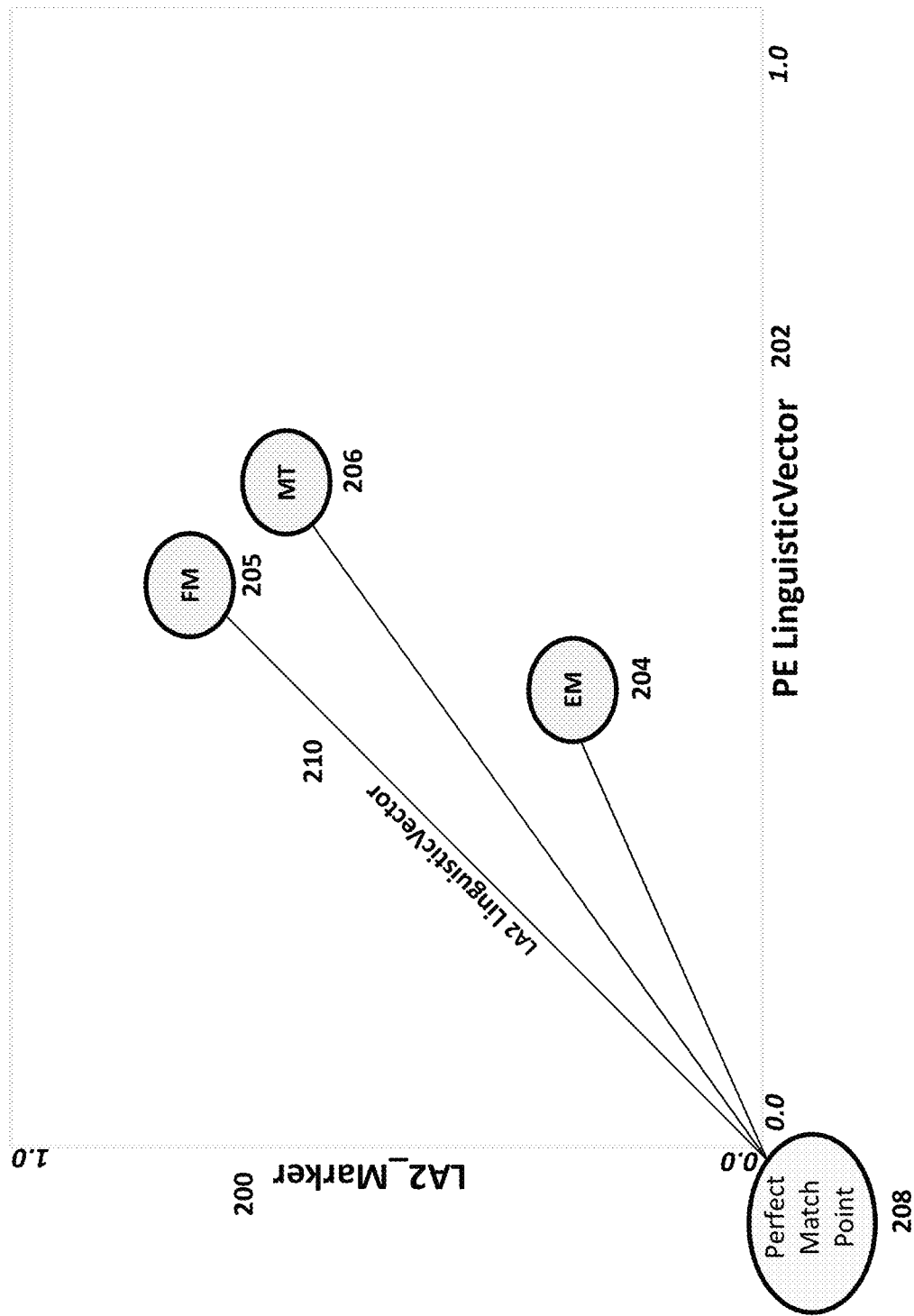
FIG. 11 depicts a graph showing a PE_LinguisticVector in accordance with aspects of the present invention.

FIG. 11 depicts an exemplary graph showing LA2_Marker 200 on the y axis, and PE_LinguisticVector 202 on the x axis, with three linguistic markers for the class sets {match type} (i.e. exact matches 204, fuzzy matches 205, and machine matches 206). Perfect Match Point 208 coordinates would be (0.0, 0.0). FIG. 11 also illustrates an LA2_LinguisticVector 210 for the Fuzzy matches 205 showing distance from the perfect match point to the Fuzzy matches 205, which is significantly larger than the Exact matches 204, indicating the Fuzzy matches 205 have a higher level of linguistic noise than Exact matches 204. In another observation, while the LA2_Marker 200 value of the Machine matches 206 is less than the Fuzzy matches 205 value, the LA2_LinguisticVector of the Fuzzy matches 205 and Machine matches 206 are approximately the same. This pattern may reflect that a MT module utilized in this example compensated better for the Linguistic noise (GSS) patterns when compared with the Fuzzy matches 205.

In another embodiment, the $LA2\_LingusiticVector_s^m$ may be computed using a 3-dimensional space with the following formula:

$$LA2\_LinguisticVector_c = \sqrt{LA2\_Marker_c^2 + PE\_Leverage_c^2 + PE\_Factor_c^2}$$

Figure 12:
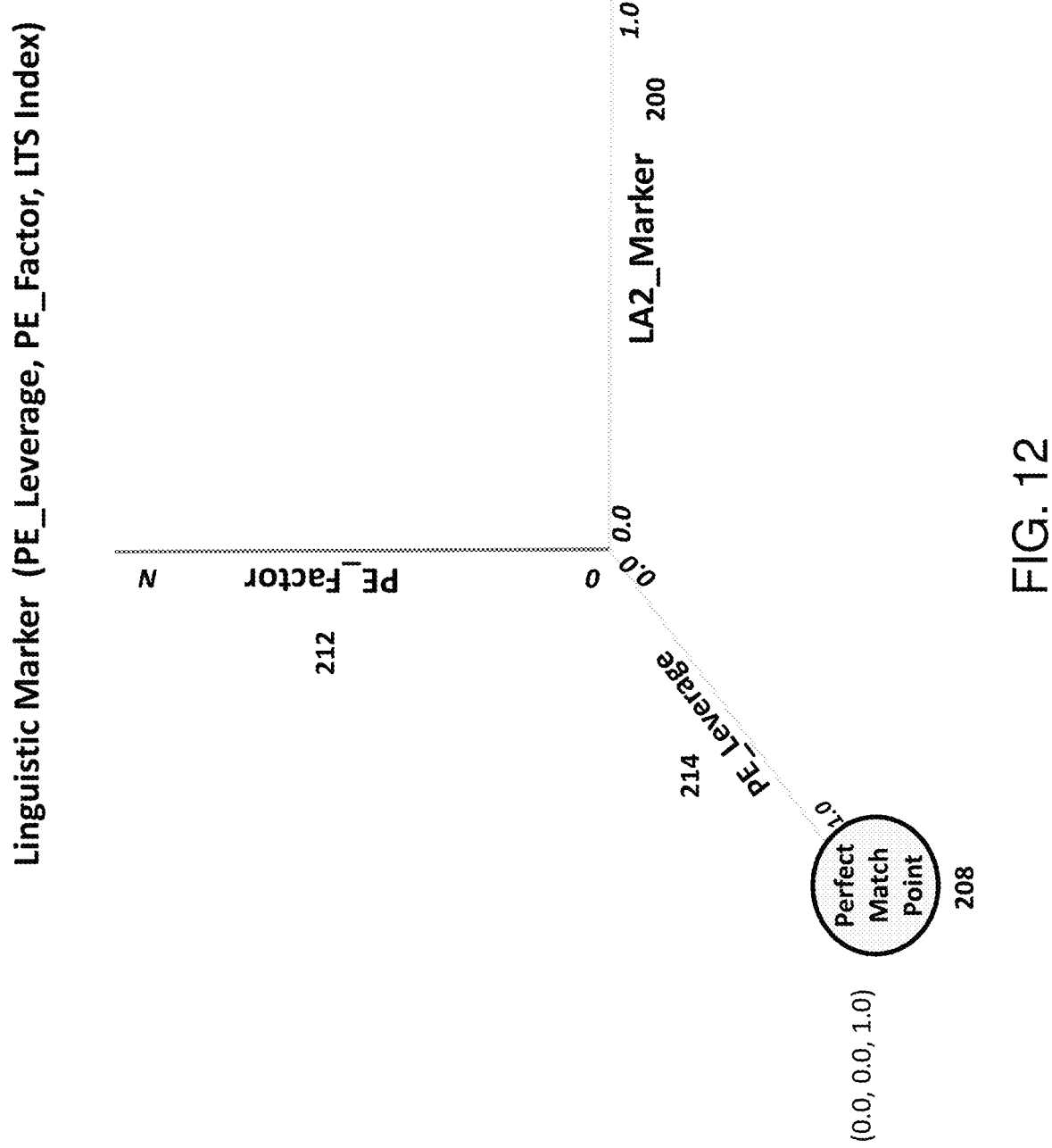
FIG. 12 depicts a graph showing a 3-dimensional coordinate system in accordance with aspects of the present invention.

FIG. 12 depicts an exemplary graph showing a 3-dimensional space with a LA2_Marker 200 on the x axis, a PE_Factor 212 on the y axis and a PE_Leverage 214 on the z axis. A 3-dimensional space enables the LA2 analyzer 120 to correlate {Linguistic noise (GSS) patterns} to more refined metrics—PE_Factor 212 and PE_Leverage 214. Correlating LA2_Marker 200 to its respective PE_Factor 212 value reflects the human labor efficiency needed to correct Linguistic noise (GSS) patterns. Correlating LA2_Marker 200 to its respective PE_Leverage 214 reflects the frequency that Linguistic noise (GSS) patterns inhibit selection of matches (i.e., the closer to 1.0, the higher percentage of match selection). The set of class set markers would be mapped into this space where the Perfect Match Point 208 coordinates would be (0.0, 0.0, 1.0).

Figure 13:
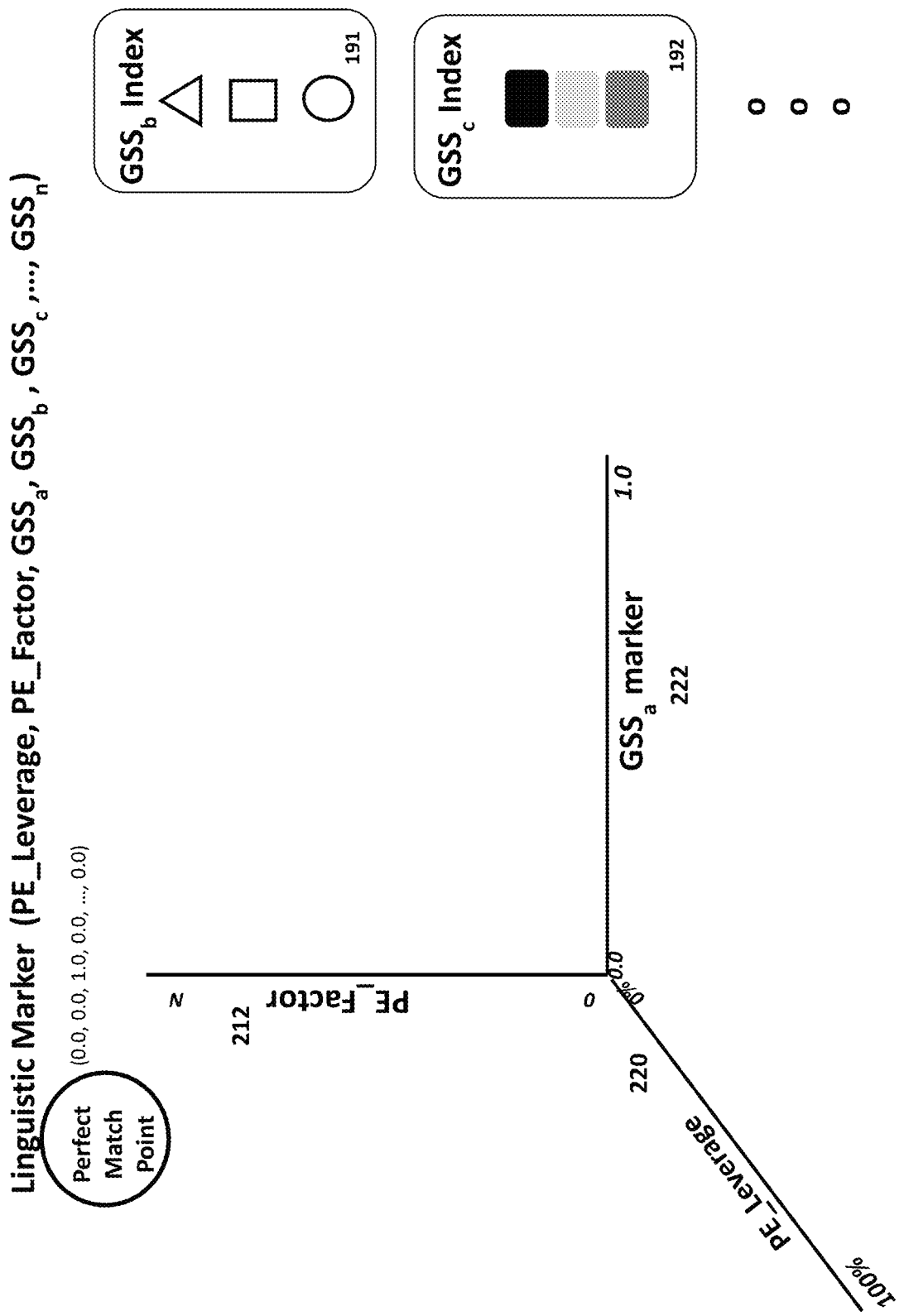
FIG. 13 is a diagram depicting an n-dimensional graphical representation of a multiple GSS makers whose x axis is a GSS marker_a value in accordance with aspects of the present invention.

FIG. 13 is an exemplary diagram depicting an n-dimensional graphical representation of multiple GSS makers (PE_Leverage 220, PE_Factor 212) whose x axis is a GSS marker_a value 222. In the embodiment of FIG. 13, the {GSS_Marker} for set of Linguistic noise (GSS) patterns a, b, c, . . . n may be computed into an n-dimensional LA2_LinguisticVector value that would enable users to visualize the entire space of Linguistic noise (GSS) patterns using colors, shapes and other visualization techniques.

Figure 14:
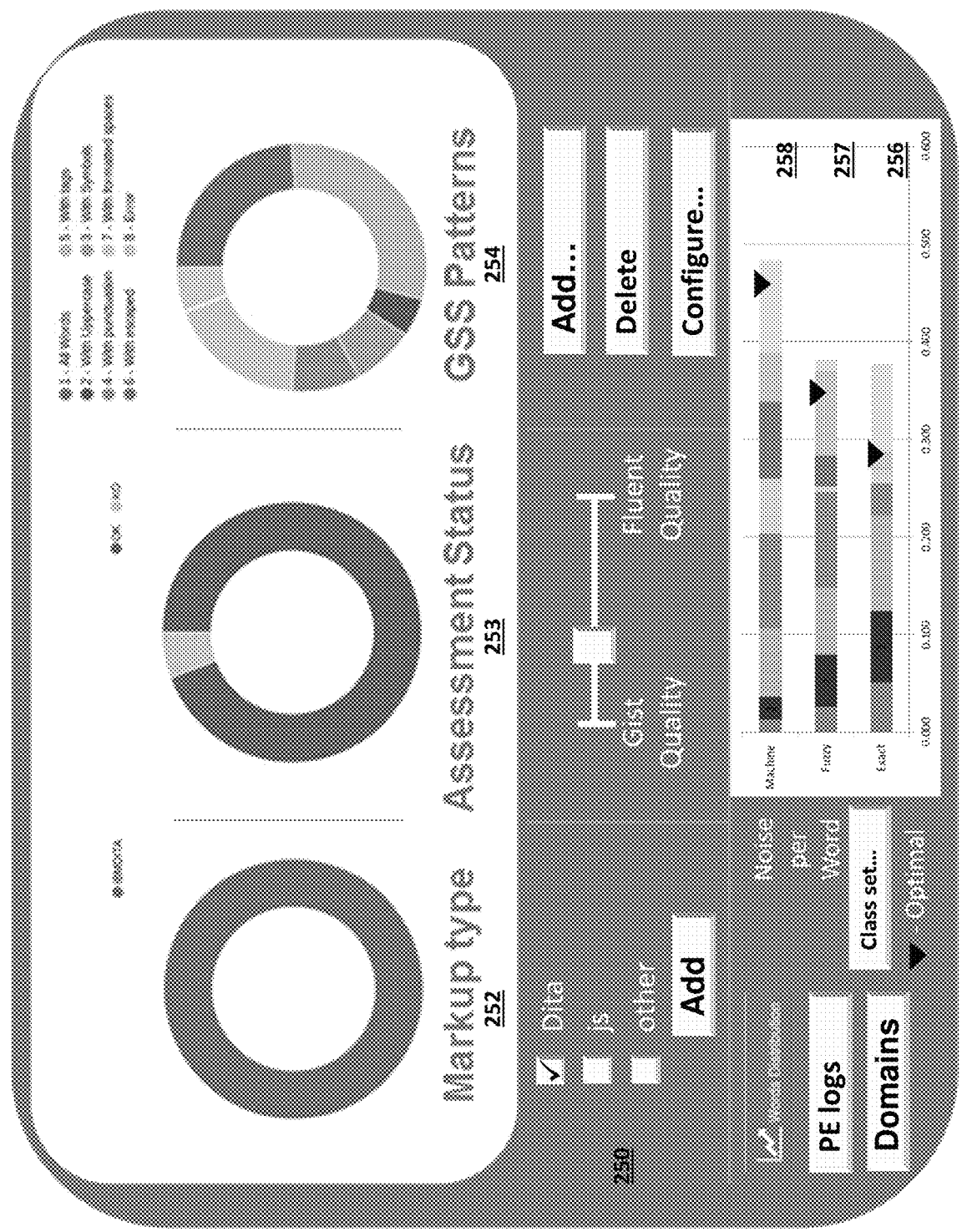
FIG. 14 illustrates an exemplary control panel interface for use with aspects of the present invention.

FIG. 14 illustrates an exemplary control panel interface 250 for use with the present invention. In embodiments, the control panel interface 250 provides a key benefit of the LTS 80. In aspects, the control panel interface 250 includes a markup type control interface 252, an assessment status control interface 253 and a Linguistic noise (GSS) patterns control interface 254, which are configured to provide a user with visualization and control of Linguistic noise (GSS) patterns impacting the efficiency of the translation supply chain being utilized (e.g., 52). The control panel interface 250 further provides visualization and control of the markup type 252 and the assessment status 253. In aspects, the control panel interface 250 includes graphics showing the noise per word (noise:word ratio) for different match types (e.g., exact matches 256, fuzzy matches 257, and machine matches 258) as well as other graphs and knobs. From the control panel interface 250, language translation operations are able to control the level of service delivered, monitor the efficiency of the L-ICs and track for issues in the translation supply chain (e.g., 52).

In another embodiment, a LTS 80 may configure with an advanced LA2 analyzer 120 that may analyze and visualize the LA2_LinguisticVectors associated with various class sets with the ability to drill down into the specific Linguistic noise (GSS) pattern level ($SNA\_Index^i$), contributing the greatest noise to the LA2_LinguisticVector. The visualization of Linguistic noise (GSS) patterns in a LTS 80 helps optimize a translation supply chain (e.g., 52).

Observations related to language translation systems and objectives of the present invention will now be discussed to aid readers in better understanding advantages and applications of the present invention.

Observation 1: Linguistic Noise Cannot be Significantly Reduced as the Cumulative Entropy from Linguistic Components Increases.

Information theory (a branch of various sciences—applied, electrical, engineering, computers, etc.) involves quantifying "information" where a key measure of information is entropy (uncertainty) of variables; specifically, the ability to predict the value of a variable which appears to act randomly (without cause). The application of the theory is developing methods for measuring the limits of signals (segments) within the operations of a communication channel (e.g. radio signals, integrated circuits, molecular codes, etc.), thus improving the integrity and "information" at the end of a channel. When applying information theory to a translation supply chain, the goal is stated as follows:

a. Develop operational metric methods that increase translation supply chain efficiency; i.e., reducing the "error rate" (measurement of linguistic noise) of communicating data (segments) over a noisy channel (a translation supply chain) to the "Channel capacity" (optimal translation supply chain metrics). For the purpose of this application, such methods are divided into "translation amplification" handlers and "translation remediation" handlers.

Those familiar with historical translation operations (prior to machine translation) recall that human linguistics always demand a lot of context, i.e. examples, dictionaries, samples, and 1-1 communication with the authors to deliver the highest fluent translation possible.

a. The "demand for context" is the foundation for the concept of "translation amplification" within modern translation supply chains.

The source segments need to be amplified with source context in order to reduce the entropy from the integration of more and more linguistics. Simply stated, translation amplification combined with translation remediation enable downstream components to deliver higher quality translation while reducing the linguistic noise measured across the translation supply chain.

Observation 2: Machine Translation (MT) Efficiency Plateaus.

Figure 15:
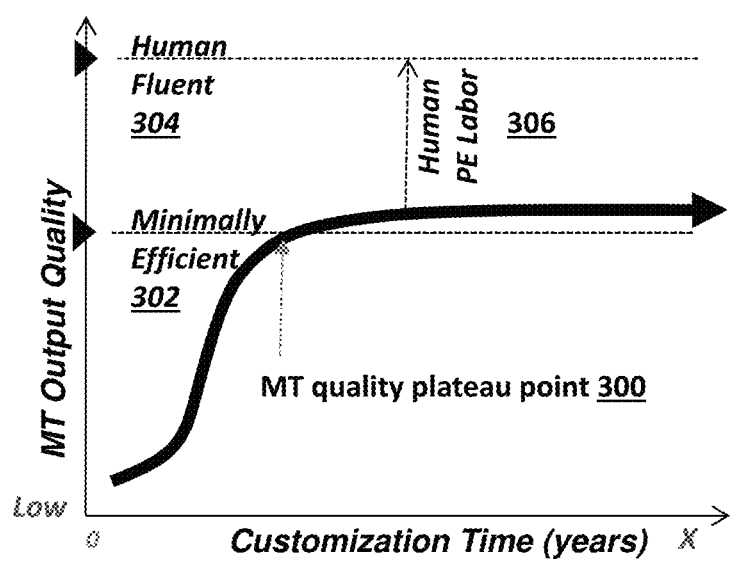
FIG. 15 is a graph depicting machine translation quality plateau point in accordance with aspects of the present invention.

FIG. 15 is a graph depicting machine translation quality plateau point 300. As depicted in FIG. 15, a learning machine translation engine's efficiency is observed to reach a MT quality plateau point 300 after its MT models are trained with approximately N (3-5) million words. At the latter plateau point, the MT efficiency, as measured in terms of the noise to word ratio (noise:word), does show noticeable improvements, as represented by the minimum efficiency line 302. After reaching the minimum efficiency line 302, there is very little improvement in the efficiency of the MT quality requiring human post editing labor 306 to reach the human fluent line 304—even if you increase the amount of learning linguistic assets. To achieve a significant S curve improvement in MT efficiency some level of investment in amplification and remediation is needed in order to reduce noise in the translation supply chain. This pattern can be observed across all languages. Note that there is still some amount of variability in the noise:word ratio across the plurality of new content package; so the MT quality plateau point 300 is a reflection of both the analysis of the noise:word ratio as well as the qualified assessment by professional human linguist feedback, also reinforced by the agreed upon payment factors applied when paying for post-editing of machine matches.

Observation 3: Incremental MT Customization has Minimal Impact on MT Efficiency.

By measuring MT output quality using the PE_Factor/PE_Leverage, it is observed that increasing the size of learning translation memory (TM) per domain (even if high quality) does not improve the MT quality output, lower PE_Factor and/or raise PE_Leverage significantly. The "law of diminishing returns" states that "in all productive processes, adding more of one factor of production while holding all others constant, will at some point yield lower incremental per-unit returns". The latter aligns with the observation that adding more and more learning TM's will eventually plateau without any significant return in efficiency within a translation supply chain. Yet, MT customization is necessary to sustain the MT quality output at "minimal efficiency" levels (e.g., minimum efficiency line 302 of FIG. 2).

Furthermore, "Zipf's law" observes that the frequency of the terms in a corpus decreases very quickly and, therefore, it is impossible for any learning/training assets (e.g., previously translated documents) to meet all the translation needs for new (changed) content. To understand this concept, consider that while a term (word) may appear only once in the learning assets, it is nearly impossible for a finite set of learning assets to deal with all the combinations of terms within new content; the MT model is limited to all the possible uses of tense/inflection found in the learning assets between the source language and target language.

Observation 4: Grammatical/Syntactic/Semantic (GSS) Patterns are Key Factors in MT Inefficiency.

By drilling down into the causes for MT inefficiency, qualitatively and quantitatively, specific GSS fault patterns can be observed, including: a) word reordering, b) word casing (upper vs. lower), c) symbols, d) blanks/spaces, e) do-not-translate sections, etc. Yet, there is no conventional uniform method for quantifying the severity of a GSS fault pattern in terms of impact to MT services. Also, it is observed that these Linguistic noise (GSS) patterns vary per language and per domain (e.g., subject matter). The language translation operations need the ability to identify the plurality of Linguistic noise (GSS) patterns occurring per language per domain, and the ability to embed GSS markers (i.e., index values) per Linguistic noise (GSS) pattern that quantify the potential noise impact per segment. Systems and methods are needed for: a) identifying an acceptable range (i.e. thresholds) for a GSS marker, and the ability to map the GSS marker to a respective pluggable remediation handler function, where each remediation handler is cognizant of many linguistic markers and is able to correctly remediate, per Linguistic noise (GSS) pattern, the new translated content.

Conclusion: More and More Linguistic Integrated Components

From observations 1-4, it is seen that increasing the amount of MT learning assets to an infinitely large set could ultimately reach a point of language GSS cognition (knowledge of all possible Linguistic noise (GSS) patterns in both source and target languages); yet the divergence to reach this point would be very slow. The number of L-ICs is growing at exponential rates (similar to what Moore's law observes within transistor integrated circuits), yet there is no conventional method for classification of L-ICs or Linguistic noise (GSS) pattern handler (i.e. functions for the cleaning and/or remediation of data). The evidence for this is seen in the growth of components within the open source Moses MT framework, the components within computer-aided translation frameworks used in post-editing, the components within linguistic asset management frameworks and others within a plethora of language translation systems.

For a translation supply chain to drive a reliable and sustainable level of human fluency quality levels, a translation synthesizer needs the ability to a) grow the plurality smaller and smarter (more productive) L-ICs specializing in increasing productivity (per unit) for downstream components, and b) have the means to measure the noise:word ratio as the unit of productivity (quality) per L-IC. The language translation operations need the systems and methods to configure L-ICs and the systems and methods to measure the productivity of each L-IC using a unified measurement system and method, e.g. a noise:word ratio. Finally, for a translation supply chain to run optimally per domain per language, the language translation operations need to be able to control the Linguistic noise (GSS) pattern specific remediation (correction in target language) handlers per segment by being cognizant of many different linguistic markers passed to it or markers computed within the L-IC.

Translation Synthesizer Markup Language (TSML).

This disclosure provides an exemplary definition of a translation synthesizer markup language (TSML) that in one embodiment would provide a rich XML-based markup language for assisting the generation of amplified source segments to be used within translation supply chain 52 and other applications.

Within this disclosure, the term "translation amplification" is used to refer to the multiple systems and methods performed by the LA2 amplifier 122 component on linguistic assets. Specifically, translation amplification may perform any one or all of the following: a) analyzing the linguistic assets, b) cleaning the assets by removing unnecessary Linguistic noise (GSS) patterns, c) transforming Linguistic noise (GSS) patterns into some normalized form and d) embedding additional translation synthesizer metadata using a TSML. Translation amplification is customized per language-domain and configured by the LA2 analyzer 122 per the {Linguistic noise (GSS) pattern}.

The primary reason for a TSML is to provide language translation operations with a way to define the "set of linguistic noise (grammatical/syntactic/semantic) patterns" {Linguistic noise (GSS) pattern} with its associated set of amplifiers handlers and remediation handlers. A secondary reason is so the TSML may be used by authors of new content 54 and the ability to supply a TSML specification for a given set of languages-domains. Ideally, a standard TSML would be accepted across the art of translation operations.

The intended use of TSML is to reduce linguistic noise across a translation supply chain (e.g., 52). More particularly, the TSML allows language translation operations to define the configuration of the LTS 80 for a specific language-domain by defining the {Linguistic noise (GSS) pattern} and the respective set of amplification and remediation handler functions. A more advanced embodiment could define the entire set of L-ICs needed to accumulate handlers for a language-domain grammar, syntax and/or semantics patterns.

The following program code provides a simplistic exemplary embodiment for a TSML configuration for defining the handling of the Linguistic noise (GSS) patterns: "tags", "symbols" and "spaces". The purpose of including TSML is not to provide an extensive markup language definition, but to provide a basis for the configuration of an LA2-SS subsystem 86. Exemplary program codes is as follows:

Translation Synthesizer Assessment Subsystem (LTSA-SS) 82.

Figure 16:
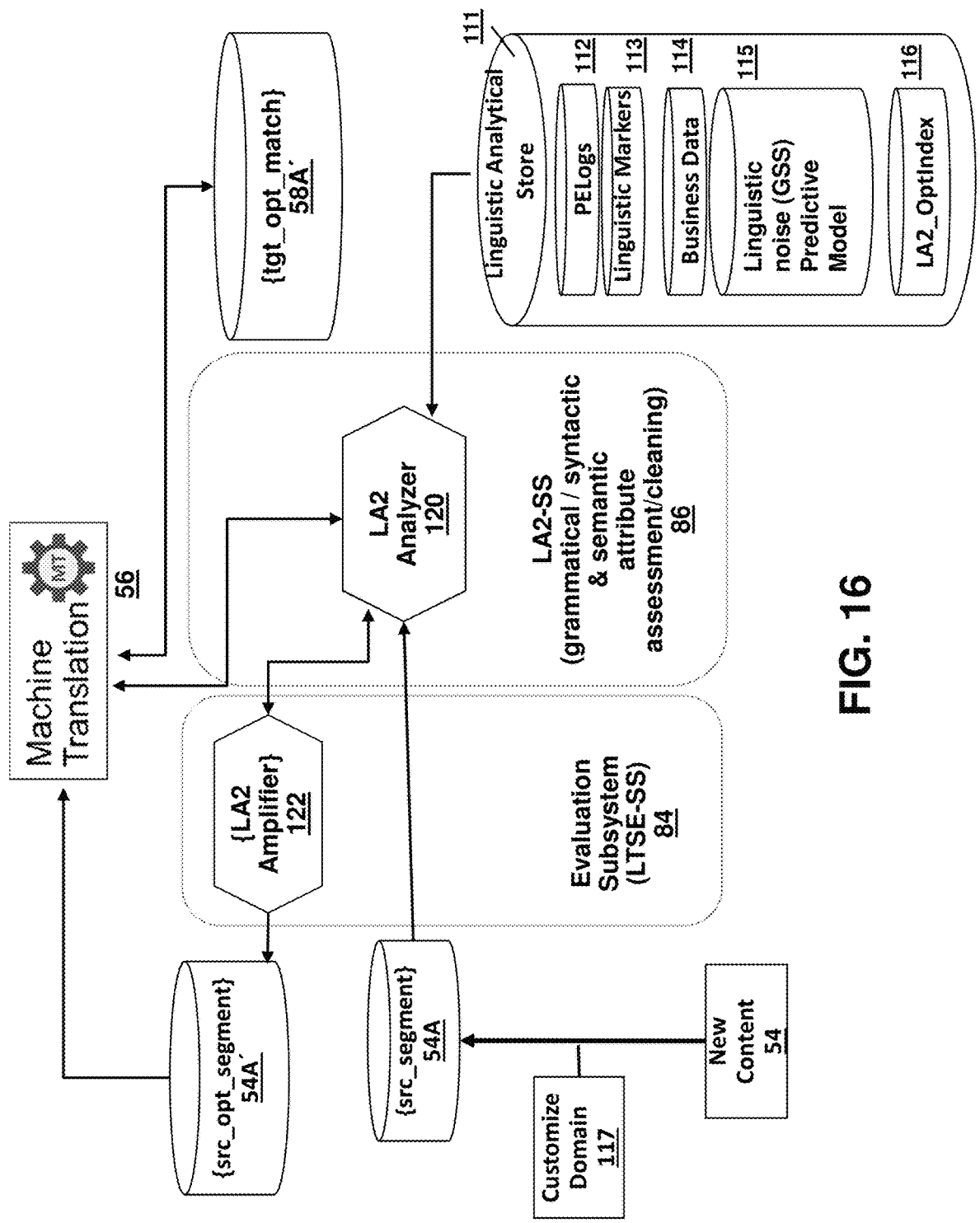
FIG. 16 shows an exemplary flow chart depicting a LTSA-SS and data flow used to amplify a source segment in accordance with aspects of the present invention.

FIG. 16 is an exemplary chart depicting a LTSA-SS subsystem 86 and the data flow used to amplify the src_segment 54A, thus reducing the linguistic noise of downstream components within a translation supply chain (e.g., 52)—typically the MT module 56 or the post-editing module 57. The input to a LTSA-SS subsystem 86 may be any linguistic asset: a) a plurality of learning translation memories (e.g., 102) for customizing an MT engine or new content 54 for a particular (customized) domain 117 prior to MT module 56.

The LA2 amplifier 122 is a key component of the LTSA-SS 82 used to amplify or increase the strength of the linguistic assets passing through translation supply chain (e.g., 52), resulting in a reduction in linguistic noise across the L-ICs within the translation supply chain.

Optimize Linguistic Assets Using LA2_Markers

Figure 17:
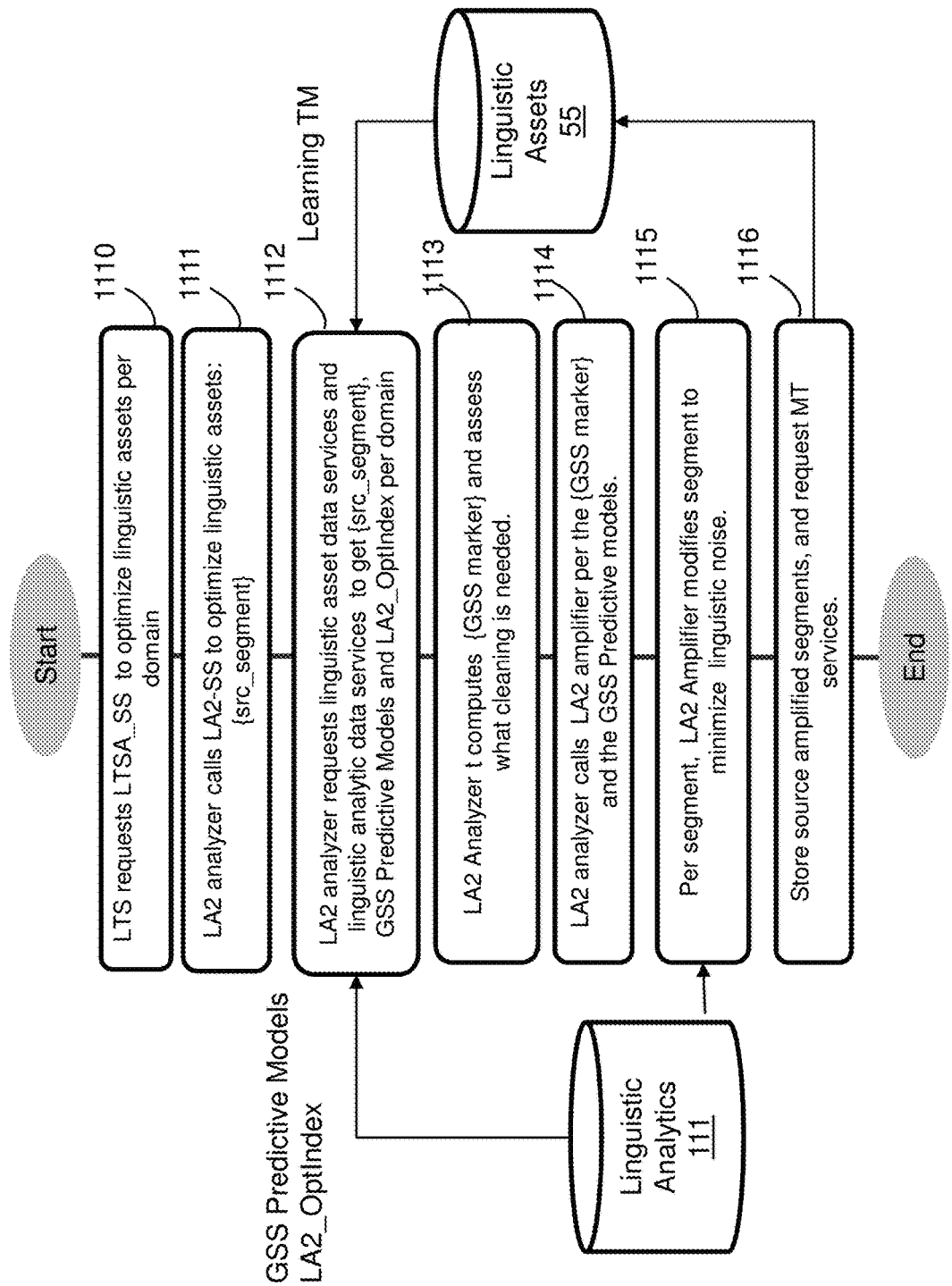
FIG. 17 is an exemplary flowchart depicting the steps taken by an LTSA-SS to perform translation amplification on a linguistic asset in accordance with embodiments of the present invention.

FIG. 17 is an exemplary flowchart depicting the steps taken by an LTSA-SS 82 for performing translation amplification on the linguistic assets module 55 prior to invoking the MT module 56.

In step 1110, the LTSA-SS 82 processing commences when the LTS 80 calls the LTSA-SS 82 and identifies the language, domain and source segment {src_segment} 54A needing translation amplification. In other words, LTS 80 requests LTSA-SS 82 to optimize linguistic assets per domain for source segment {src_segment} 54A.

In step 1111, the LTSA-SS 82 calls the LA2 analyzer 120 of the LA2-SS subsystem 86 to perform translation amplification (i.e., optimize linguistic assets) for the source segment {src_segment} 54A. The LA2 analyzer 120 loads the set of Linguistic noise (GSS) pattern handler functions per language-domain.

In step 1112, the LA2 analyzer 120 calls the linguistic asset data services 88 to retrieve source segment {src_segment} 54A needing translation amplification; the LA2 analyzer 120 calls the linguistic analytic data services 89 to retrieve the plurality of GSS predictive models 116 and LA2_OptIndex 117 associated with the language-domain.

In step 1113, the LA2 analyzer 120 computes the plurality of {GSS_Marker} for each source segment {src_segment} 54A (see LA2 analyzer steps 800 and 802 in FIG. 8). The LA2 analyzer 120 analyzes, classifies and aggregates the plurality of {GSS_Marker} by class sets to compute the

```
<?xml version="1.0"?>
<translationsynthesis version="1.0"
    xsi:schemaLocation="http://TSML_URL/translationamplificaiton.xsd"
    xml:lang="en-US">
  <LinguisticNoisePattern name=tags>
      <GSS_tag name=codeph amplifyhandler=GSS_escape>codeph</GSS_tag>
  </LinguisticNoisePattern>
  <LinguisticNoisePattern name=symbols>
      <GSS_sym name=colon amplifyhandler=GSS_colon>@</GSS_sym>
  </LinguisticNoisePattern>
  <LinguisticNoisePattern name=spaces>
      <GSS_space name=colon amplifyhandler=GSS_space>@</GSS_space>
  </LinguisticNoisePattern>
</translationamplification>
```

In the latter example, the space of Linguistic noise (GSS) patterns is detailed by instances of the Linguistic noise (GSS) pattern stanza. The specific Linguistic noise (GSS) pattern handlers and actual pattern would be defined by a regular expression detailing the rules for recognizing a Linguistic noise (GSS) pattern within a segment.

plurality of $LA2\_Marker_c$ per the {class set} defined in the plurality of GSS predictive models (see LA2 analysis 120 steps 804-810 in FIG. 8).

In one exemplary embodiment, the LA2 analyzer 120 aggregates the {GSS_Marker} to create the {$LA2\_Maker_s^m$} for the class set (s,m) where s is {segment scope} (small segment class set event data, medium segment class set event data, large segment class set event data) and m is {match type} (exact match class set event data, fuzzy match class set event data, machine translation class set event data). This disclosure is not intended to be limited to any definition of class sets; the class sets are defined by analysis and computing of the GSS predictive models.

In step 1114, the LA2 analyzer 120 uses the plurality of GSS predictive models 116 and the {LA2_OptIndex} 117 per class set to identify and prioritize the {Linguistic noise (GSS) pattern} needing translation amplification. The purpose of the analytical feedback loop (i.e. the GSS predictive models), is to prioritize which Linguistic noise (GSS) patterns need translation amplification and which do not justify translation amplification. Some Linguistic noise (GSS) patterns may be recognized but do not justify translation amplification since the impact on linguistic noise is minimal or the return on investment for amplification is not justified.

In step 1115, for {Linguistic noise (GSS) patterns} needing translation amplification, the LA2 analyzer 120 computes the {LA2_Marker$_c$} to identify and invoke the LA2 amplifier 122 per class set. The LA2 amplifier 122 invokes the specific Linguistic noise (GSS) pattern translation amplification function to perform translation amplification on the {src_segment} within the class set defined by LA2_Marker$_c$, producing the set of amplified segments referred to as {src_amplified_segment}.

Referring back to FIG. 6A, an exemplary illustration of a src_segment 54A is shown passing through the LA2 amplifier 122 that automatically performs translation amplification to produce a src_amplified_segment 154. This example illustrates a "markup tag" translation amplification where markup tags "<codeph> . . . </codeph> have been normalized into an optimal form of @codeph-#@. Per FIG. 7, the symbols '@' have a lower SNA_2 noise weight than the tag SNA_4; thus by converting the source tag into an optimal form within the TSML, the machine translation of the text surrounding the tags is improved and thus reduces the linguistic noise produced by the MT module 56.

Referring back to FIG. 17, in step 1116, the LA2 amplifier 120 uses the linguistic asset data service 88 to store the {src_amplified_segment} 154 into the linguistic asset store 101.

Translation Synthesizer Evaluation Subsystem (LTSE-SS).

Figure 18:
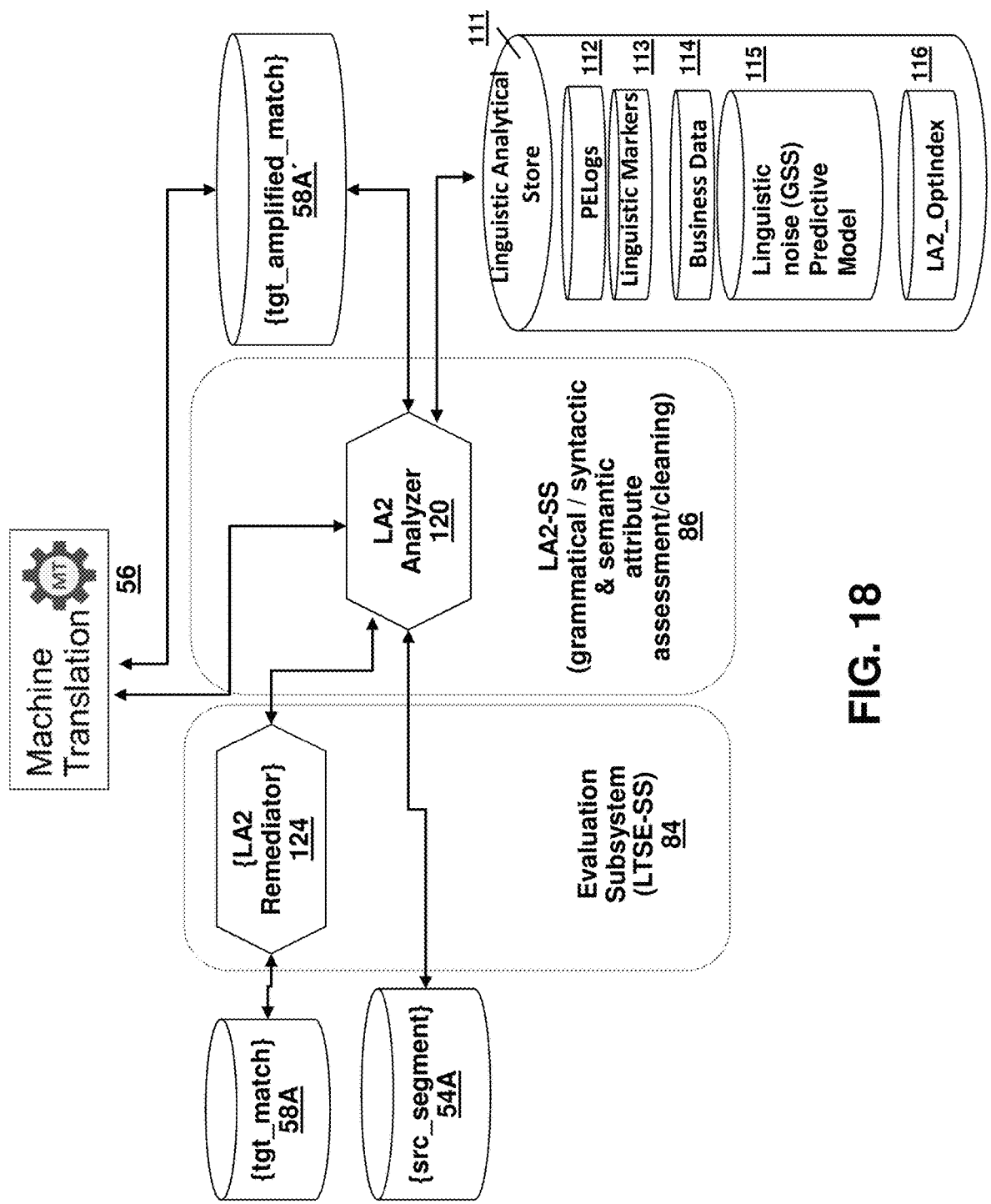
FIG. 18 is a chart depicting a translation synthesizer evaluation subsystem (LTSE-SS) and the data flow used to remediate an amplified target segment in accordance with aspects of the invention.

FIG. 18 is an exemplary chart depicting a LTSE-SS 84 of the present invention and the data flow used to remediate the {tgt_amplified_match} produced by an upstream component of a translation supply chain 52, typically the MT module 56 or the post-editing module 57. The input to a LTSE-SS 84 may be any plurality of translated segments and/or matches 58A containing translation amplification metadata.

The LA2 remediator 124 is a key component of the LTSE-SS 84 used to remediate a {tgt_amplified_match} 156 back into a {tgt_match} 58A. Within this disclosure, the term "translation remediation" is used to refer to the multiple systems and methods performed by the LA2 remediator 124 on translated linguistic assets amplified according to the TSML. The plurality of remediation handler functions is associated with a specific Linguistic noise (GSS) pattern and knows the set of translation amplification forms as defined by a TSML.

Remediate Amplified Linguistic Assets using GSS markers

Figure 19:
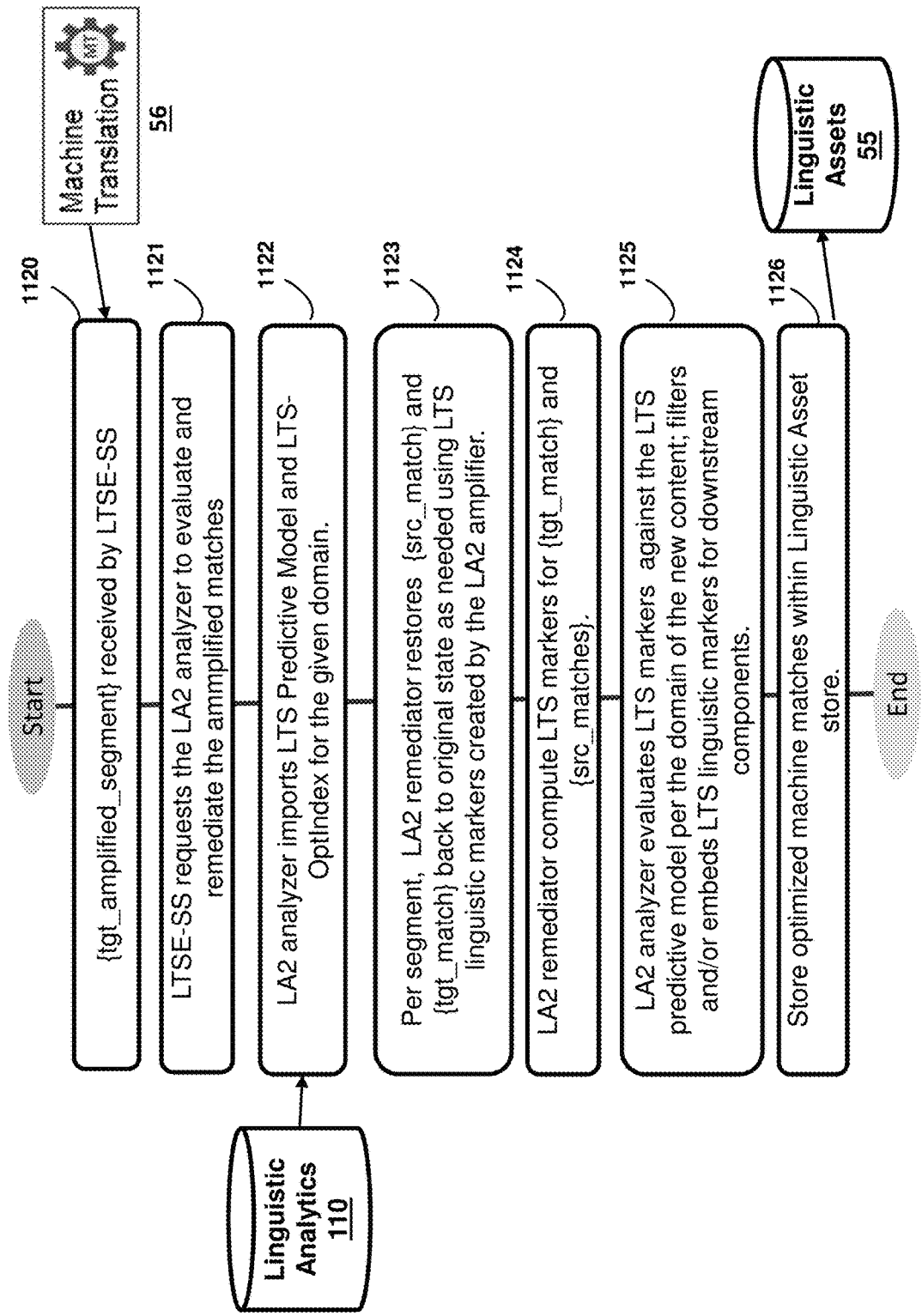
FIG. 19 is a flowchart depicting steps taken by an LTSE-SS for performing translation remediation in accordance with aspects of the present invention.

FIG. 19 is an exemplary flowchart depicting the steps taken by an LTSE-SS 84 for performing translation remediation. The LTSE-SS 84 processing commences in step 1120 when the LTS 80 is notified that the {tgt_amplified_segment} 154 associated with a language-domain has completed translation (typically by the MT module 56 and/or the post-editing module 57).

In step 1121, the LTSE-SS 84 calls the LA2 analyzer 120 of the LA2-SS subsystem 86 to perform remediation of {tgt_amplified_segment} 154. The LA2 analyzer 120 loads the set of Linguistic noise (GSS) pattern handler functions associated with the {Linguistic noise (GSS) patterns} and configured per language-domain by the LA2 analyzer 120.

In step 1122, the LA2 analyzer 120 calls the linguistic analytic data services 89 to retrieve the {tgt_amplified_segment} 154 needing remediation. The LA2 analyzer 120 calls the linguistic asset data services 88 to retrieve the plurality of GSS predictive model 115 and LA2_OptIndex 116 associated with the language-domain.

In step 1123, the LA2 analyzer 120 computes the {GSS_Marker} for the {tgt_amplified_segment} 154. See steps 800-802 of FIG. 8. The LA2 analyzer 120 analyzes, classifies and aggregates the {GSS_Marker} by class sets to compute the plurality of LA2_Marker$_c$ per the class sets defined in the plurality of GSS predictive models. See steps 804-810 of FIG. 8.

In one exemplary embodiment, the LA2 analyzer 120 aggregates the {GSS_Marker} to create the {LA2_Maker$_s^m$} for the class set (s,m) where s is {segment scope} (small segment class set event data, medium segment class set event data, large segment class set event data) and m is {match type} (exact match class set event data, fuzzy match class set event data, machine translation class set event data).

In step 1124, the LA2 analyzer 120 may use the computed {LA2_Marker} to identify and invoke the LA2 remediator 124 per class set. Note that not all Linguistic noise (GSS) patterns will need remediation per the LTSA-SS 82. The LA2 remediator 124 invokes the specific Linguistic noise (GSS) pattern remediation function to perform remediation on the {tgt_amplified_segment} 154 within the class set defined by LA2_Marker$_c$ producing the set of {tgt_match} 58A.

Referring back to FIG. 6B, an exemplary illustration of a tgt_amplified_segment 154 is shown passing through the LA2 remediator 124 that automatically performs remediation to produce a tgt_match or target match 58A. This example illustrates a combination of "SNA_4 markup tag" and "SNA_5 escaped chars" remediation where the amplified optimal form of @codeph-#@ is remediated back into the original markup tags "<codeph> . . . </codeph>. Per FIG. 7, the "SNA_5 escaped chars" are used to identify Linguistic noise (GSS) patterns that should not be translated, and the tag <codeph> is a tag to escape code that should not be translated. Thus, the TSML defines the remediation of the form @codeph-#@ back to the original markup form, thereby preserving the escaped characters and reducing the linguistic noise from MT module 56.

Referring back to FIG. 19, in step 1125, the LA2 analyzer evaluates LTS markers against the predictive model 115 per the domain of the new content 54, and filters and/or embeds LTS linguistic markers for downstream components.

In step 1126, the LA2 remediator 124 uses the linguistic asset data services 88 to store the {tgt_match} 58A into the linguistic asset store 101.

Advantageously, the present invention provides an LTS 80 and related methods that provide pluggable configuration systems for L-IC's enabling a translation supply chain to synthesize high quality translations for more languages and domains. The system and methods presented allow a LTS

80, specifically LA2-SS subsystem 86, to visualize and classify Linguistic noise (GSS) pattern at the segment level, thus reducing the linguistic noise across a translation supply chain 52. The plug-and-play methods enable the translation supply chain 52 to scale and customize the set of L-ICs to handle critical Linguistic noise (GSS) patterns. The LA2-SS subsystem 86 enables language translation operators to use a control panel 250 to control Linguistic noise (GSS) patterns (see FIG. 7) and use an analytical feedback loop on optimizing amplification (contextual enhancement before MT module 56) and remediation (fix up after MT module 56) at the segment level; collectively this optimizes the MT module 56 and the post-editing module 57 efficiency. The language translation system 50 of the present invention improves human professional linguists post-editing efficiency at post-editing module 57 by establishing a uniform productivity per unit, i.e. noise:word ratio per segment. This enables the language translation operators to see insight into where to invest in amplification and remediation of Linguistic noise (GSS) patterns, thus avoiding the law of diminishing return by tracking and optimizing n variables simultaneously. The LA2-SS subsystem 86 provides the visualization and analytics to manage the tuning of linguistic noise (GSS) predictive models using an analytical feedback loop and the systems and methods for identifying acceptable ranges of performance for each critical GSS marker.

Grammar, syntactic and semantic patterns are one potential source of linguistic noise (specifically, morphological differences between source and target languages) but there can be many different variables. To address the multitude of other translation variables, more and more linguistic integrated components will be needed. In some cases, these linguistic patterns (e.g., grammar, syntactic and semantic patterns) can be handled inside the sub-systems (MT module 56, linguistic assets module 55, post-editing module 57). In other cases, amplification/remediation is needed between subsystems to optimize overall throughput. Novel aspects of the present invention lie not in the specific cases of morphological differences but in: a) collection of 'per unit metadata', and b) the operational management of the L-IC's; all developed in combination within a unified linguistic noise coordinate system and the analytical modeling of the L-IC metadata at the unit level. This allows the system 50 of the present invention to create predictive models per L-IC.

Exemplary Scenarios

In one exemplary scenario, a translation supply chain 52 of the present invention is used in a help desk ticket handling environment, wherein system 50 is a ticket handling system. The incoming events or content 54 (e.g., a plurality of source segments 54A) are generated by a ticket handling system for translation from Language to English by the help support personnel. A certain percentage of tickets are passed through post-editing module 57 to correct faults in the output (translated content 54) from MT module 56, with corrections (e.g., GSS predictive models 115 derived from PE logs 112) fed to the MT module 56 to help the MT module 56 more efficiently translate content. As an example, LTS 80 detects that many tickets are found to contain a break tag <BR>, which really represent two (2) sentences. The issue is that an MT module 56 would typically view each ticket as one (1) unit and thus the words surrounding the <BR> are affected negatively (i.e., the words before the <BR> and post <BR> are affected negatively causing faults in the translation). In this case the LA2 amplifier 122 would add markers 152 for each occurrence of a break tag which would flow through the post-editing corrections made at the post-editing module 57. The LA2 analyzer 120 would analyze the PE logs 112 and detect that the tag <BR> is causing a higher percentage of corrections and would cause a trigger for handling the <BR> pattern via a customized integrated linguistic component. A request is then sent to the operations team to evaluate and build an amplifier/remediator filter for handling the <BR> pattern.

In the ticket handling scenario above, an amplification filter would be built and deployed into the amplifier/remediator (LA2 amplifier 122 and LA2 remediator 124). Specifically, an L-IC_SPLIT_SEGMENT is applied and associated with the occurrence of the break tag. The L-IC_SPLIT_SEGMENT would split a ticket into two (2) requests prior to going into the MT module 56, and would also add metadata necessary to tell the LA2 remediator 124 to join the two (2) parts together into one (1) segment.

In another exemplary scenario, a translation supply chain 52 of the present invention is used to handle user data from a source language (content 54). In this scenario, a translation of the source language from the original language to a target language is needed in real time. Sometimes the source language may contain words that are already in the target language, which would confuse the MT module 56. In this case the LA2 amplifier 122 would add markers 152 to each occurrence of words detected to not be in the source language. The results of this analysis would then be used by the LA2 analyzer 120 to determine how often this occurs, and whether it is impacting the quality of the translated output. This translation scenario raises issues with not only the MT module 56 application program interface (API), but with the training materials used to help the MT module 56 learn. For example, in Canada where English and French are intermixed, this would be a problem for the whole translation supply chain 52. If the occurrence is in-frequent and doesn't impact the MT module 56 learning then this is a different case.

In order to address the dual-language scenario above, an amplification filter would be built and deployed into the supply chain 52 of the present invention. Specifically, an L-IC_PASSTHRU_FORIEGN_WORDS would be applied and that would add meta data to ensure foreign words are passed through the MT module 56. The L-IC_PASSTHRU_FORIEGN_WORDS amplifier would substitute foreign word with metadata that would pass through the MT module 56 and tell the LA2 remediator 124 to plug back the foreign words.

In another scenario, a translation supply chain 52 of the present invention is associated with languages where the word order is morphologically very different than the source language. The specific case is the German language, where many different forms of verbs are handled differently as compared to the English language. MT modules are typically tailored to handling sequences of word orders usually around 4-5 surrounding words. This is further compounded when commas, semi-colons and other syntactic forms are joined together. In this case the LA2 amplifier 122 would add markers 152 for each occurrence of special characters (commas, semicolons, etc.) that would flow through the post-editing corrections made at the post-editing module 57. The LA2 analyzer 120 would analyze the PE logs 112, and would detect that the GSS special character cases is causing a higher percentage of corrections (only in German) and would cause a trigger for handling special character patterns via a customized L-IC. A request would then be sent to the operations team to evaluate and build an amplifier/remediator filter for handling the <BR> pattern.

In order to address the word order translation problems above, an amplification filter would be built and deployed into the LA2 remediator 124. Specifically, an L-IC_MAX_SPECIAL_CHARS would be deployed such that it would detect that the occurrence of too many special characters would cause post editing in-efficiencies. The L-IC_MAX_SPECIAL_CHARS would actually delete the MT module 56 translation prior to going into the post-editing module 57. This same L-IC could be used to pass through 'registered name entities' (i.e., within the translation supply chain 52 some terms should not be translated). The LA2 amplifier 122 could be built to have a NER (Named Entity Recognizer) to ensure entity names are passed through.

In embodiments, a service provider, such as a Solution Integrator, could offer to perform the processes described herein. In this case, the service provider can create, maintain, deploy, and support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for translating a source segment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computing device, a source segment comprising a first language to be translated into a second language, the source segment including markup tags comprising escape codes that indicate words that should not be translated;
   transforming, by the computing device, the source segment into an amplified source segment, wherein the markup tags are transformed from a first form to a second form different from the first form based on predetermined segment noise categories identifying linguistic patterns contributing to translation inefficiency, thereby reducing linguistic noise associated with the first form of the markup tags and producing the amplified source segment;
   sending, by the computing device, the amplified source segment to a machine translation module, wherein the machine translation module is configured to process the amplified source segment, thereby producing a return amplified match in a second language, the return amplified match including the markup tags in the second form;
   receiving, by the computing device, the return amplified match from the machine translation module; and
   remediating, by the computing device, the return amplified match by replacing the markup tags in the second form with the markup tags in the first form within the source segment, thereby producing an output.

2. The computer-implemented method of claim 1, further comprising translating, by the machine translation module, the amplified source segment, thereby producing the return amplified match.

3. The computer-implemented method of claim 1, further comprising sending, by the computer device, the output to a post editing module.

4. The computer-implemented method of claim 3, further comprising editing, by the computing device, the output at the post-editing module to produce a return amplified match in the second language, wherein the editing produces post-editing logs including information regarding changes made to the output, thereby producing the return amplified match.

5. The computer-implemented method of claim 4, further comprising collecting and storing, by the computing device, the post-editing logs generated by the post-editing module.

6. The computer-implemented method of claim 5, further comprising:
   analyzing, by the computing device, the post-editing logs to identify additional linguistic patterns contributing to translation inefficiency;
   generating, by the computing device, a predictive model based on the identified additional linguistic patterns; and
   saving, by the computing device, the predictive model in a store.

7. The computer-implemented method of claim 6, further comprising:
   receiving, by the computing device, a new source segment in the first language to be translated into the second language;
   identifying, by the computing device, linguistic markers within the new source segment and associated noise values based on the predictive model to produce a tagged new source segment;
   transforming, by the computing device, the tagged new source segment into an amplified new source segment; and
   sending, by the computing device, the amplified new source segment to a machine translation module, wherein the machine translation module is configured to process the amplified new source segment to produce a return new amplified match in the second language.

8. The computer-implemented method of claim 1, further comprising displaying, by the computing device, a graphical representation of linguistic patterns of the source segment.

9. A computer program product comprising a computer readable storage medium having program instructions embodied therewith, the program instructions executable by a computing device to cause the computing device to:
   receive a source segment in a first language to be translated into a second language, the source segment including markup tags comprising escape codes that indicate words that should not be translated;

transform the source segment into an amplified source segment, wherein the markup tags are transformed from a first form to a second form different from the first form based on predetermined segment noise categories identifying linguistic patterns contributing to translation inefficiency, thereby reducing linguistic noise associated with the first form of the markup tags and producing the amplified source segment;

send the amplified source segment to a machine translation module, wherein the machine translation module is configured to process the amplified source segment to produce a return amplified match in the second language, the return amplified match including the markup tags in the second form;

receive the return amplified match from the machine translation module; and remediate the return amplified match by replacing the markup tags in the second form with the markup tags in the first form to produce a target match.

10. The computer program product of claim 9, wherein the program instructions further cause the computing device to translate the amplified source segment to produce the return amplified match.

11. The computer program product of claim 9, wherein the program instructions further cause the computing device to:
identify a domain of the source segment, wherein the transforming the source segment into an amplified source segment is based on the domain of the source segment; and
send the target match to a post editing module.

12. The computer program product of claim 11, wherein the program instructions further cause the computing device to edit the target match at the post-editing module to produce a return amplified match in the second language, wherein the editing produces post-editing logs including information regarding changes made to the target match to produce the return amplified match.

13. The computer program product of claim 12, wherein the program instructions further cause the computing device to collect and store the post-editing logs generated by the post-editing module.

14. The computer program product of claim 13, wherein the program instructions further cause the computing device to:
analyze the post-editing logs to identify additional linguistic patterns contributing to translation inefficiency;
generate a predictive model based on the identified additional linguistic patterns; and
save the predictive model in a store.

15. The computer program product of claim 14, wherein the program instructions further cause the computing device to:
receive a new source segment in the first language to be translated into the second language;
identify linguistic markers within the new source segment and associated noise values based on the predictive model to produce a tagged new source segment;
transform the tagged new source segment into an amplified new source segment; and
send the amplified new source segment to a machine translation module, wherein the machine translation module is configured to process the amplified new source segment to produce a return new amplified match in the second language.

16. The computer program product of claim 9, wherein the program instructions further cause the computing device to display a graphical representation of linguistic patterns of the source segment.

17. A system comprising:
a processor, a computer readable memory and a computer readable storage medium associated with a computing device;
program instructions to receive a source segment in a first language to be translated into a second language, the source segment including markup tags comprising escape codes that indicate words that should not be translated;
program instructions to identify a domain of the source segment;
program instructions to identify noise values associated with the markup tags within the source segment based on a predictive model associated with the domain, wherein the predictive model is one of a plurality of models associated with different domains;
program instructions to transform the tagged source segment into an amplified source segment, wherein the markup tags are transformed from a first form to a second form different from the first form based on predetermined segment noise categories identifying linguistic patterns contributing to translation inefficiency, thereby reducing linguistic noise associated with the first form of the markup tags and producing the amplified source segment;
program instructions to send the amplified source segment to a machine translation module, wherein the machine translation module is configured to process the amplified source segment to produce a return amplified match in the second language, the return amplified match including the markup tags in the second form;
program instructions to receive the return amplified match from the machine translation module; and
program instructions to remediate the return amplified match by replacing the markup tags in the second form with the markup tags in the first form to produce a target match,
wherein the program instructions are stored on the computer readable storage medium for execution by the processor via the computer readable memory.

18. The system of claim 17, further comprising program instructions to send the target match to a post editing module.

19. The system of claim 18, further comprising:
program instructions to obtain post-editing logs generated by the post-editing module, the post-editing logs including information regarding changes made to the target match at the post-editing module;
program instructions to analyze the post-editing logs to identify additional linguistic patterns contributing to translation inefficiency;
program instructions to update the predictive model based on the identified additional linguistic patterns; and
program instructions to save the updated predictive model in a store.

20. The system of claim 19, further comprising:
program instructions to receive a new source segment in the first language to be translated into the second language;
program instructions to identify linguistic markers within the new source segment and associated noise values based on the updated predictive model to produce a tagged new source segment;

program instructions to transform the tagged new source segment into an amplified new source segment; and
program instructions to send the amplified new source segment to a machine translation module, wherein the machine translation module is configured to process the amplified new source segment to produce a return new amplified match in the second language.

\* \* \* \* \*